(12) United States Patent
Ito et al.

(10) Patent No.: US 7,245,618 B2
(45) Date of Patent: Jul. 17, 2007

(54) COMMUNICATION DEVICE FOR AUTOMATICALLY SETTING A ROUTER CONFIGURATION AND METHOD OF CONTROLLING THE DEVICE

(75) Inventors: Yuji Ito, Fukuoka (JP); Noritake Izaiku, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1141 days.

(21) Appl. No.: 09/957,141

(22) Filed: Sep. 20, 2001

(65) Prior Publication Data

US 2002/0159448 A1    Oct. 31, 2002

(30) Foreign Application Priority Data

Apr. 26, 2001    (JP) ............................ 2001-130217

(51) Int. Cl.
H04L 12/28    (2006.01)
H04L 12/06    (2006.01)

(52) U.S. Cl. ...................................... 370/392; 370/389

(58) Field of Classification Search ........ 370/254–256, 370/401, 392, 389, 402, 403
See application file for complete search history.

(56) References Cited

U.S. PATENT DOCUMENTS

| | | | | |
|---|---|---|---|---|
| 4,667,321 A | * | 5/1987 | Goodman | 370/536 |
| 5,313,465 A | * | 5/1994 | Perlman et al. | 370/254 |
| 5,488,608 A | * | 1/1996 | Flammer, III | 370/400 |
| 5,583,997 A | * | 12/1996 | Hart | 709/218 |
| 5,781,552 A | | 7/1998 | Hashimoto | |
| 6,532,217 B1 | * | 3/2003 | Alkhatib et al. | 370/252 |
| 6,684,241 B1 | * | 1/2004 | Sandick et al. | 709/220 |
| 6,697,360 B1 | * | 2/2004 | Gai et al. | 370/389 |
| 6,700,877 B1 | * | 3/2004 | Lorenz et al. | 370/254 |
| 6,763,023 B1 | * | 7/2004 | Gleeson et al. | 370/392 |
| 6,856,602 B1 | * | 2/2005 | Westberg | 370/254 |
| 6,912,205 B2 | * | 6/2005 | Perlman et al. | 370/254 |
| 6,912,223 B1 | * | 6/2005 | Sloane | 370/401 |
| 2001/0007567 A1 | * | 7/2001 | Ando et al. | 370/469 |
| 2002/0003780 A1 | * | 1/2002 | Braun et al. | 370/254 |
| 2004/0165591 A1 | * | 8/2004 | Conte et al. | 370/392 |
| 2004/0202158 A1 | * | 10/2004 | Takeno et al. | 370/389 |

FOREIGN PATENT DOCUMENTS

| | | |
|---|---|---|
| JP | 7-264211 | 10/1995 |
| JP | 9-162887 | 6/1997 |
| JP | 09162887 | 6/1997 |
| JP | 2679613 | 8/1997 |

* cited by examiner

Primary Examiner—Ricky Q. Ngo
Assistant Examiner—Warner Wong
(74) Attorney, Agent, or Firm—Katten Muchin Rosenman LLP

(57) ABSTRACT

A communication device includes a first part transmitting information to and receiving information from an adjacent device, a second part managing address information of all mounting ports of the communication device, a first port of the adjacent device, and a network to be constructed, the first port being connected to the communication device, a third part automatically determining addresses for the mounting ports of the communication device and the first port of the adjacent device so that the addresses are not duplicated; and a fourth part managing address determination authority to determine the addresses.

12 Claims, 22 Drawing Sheets

FIG.11

| IP ADDRESS | NETWORK MASK | MAC ADDRESS | ROUTER IDENTIFICATION | PORT IDENTIFICATION | EXTERNAL ENTRY | AUTHORITY TYPE | GENERATION TYPE | DHCP OPERATION |
|---|---|---|---|---|---|---|---|---|
| 192.168.1.1 | 255.255.255.0 | 00:10:00:00:00:01 | R1 | COMMON | NO | PARENT ROUTER/DEVICE-REPRESENTATIVE | VARIABLE | INDIVIDUAL |
| 192.168.1.1 | 255.255.255.0 | 00:10:00:00:00:01 | R1 | R1P1 | NO | GENERAL | VARIABLE | INDIVIDUAL |
| 192.168.2.1 | 255.255.255.0 | 00:10:00:00:00:02 | R1 | R1P2 | NO | GENERAL | VARIABLE | INDIVIDUAL |
| 192.168.3.1 | 255.255.255.0 | 00:10:00:00:00:03 | R1 | R1P3 | NO | GENERAL | VARIABLE | INDIVIDUAL |
| 192.168.2.10 | 255.255.255.0 | 00:30:00:00:00:01 | R2 | COMMON | NO | DEVICE-REPRESENTATIVE | VARIABLE | INDIVIDUAL |
| 192.168.4.1 | 255.255.255.0 | 00:30:00:00:00:01 | R2 | R2P1 | NO | GENERAL | VARIABLE | INDIVIDUAL |
| 192.168.2.10 | 255.255.255.0 | 00:30:00:00:00:02 | R2 | R2P2 | NO | GENERAL | VARIABLE | INDIVIDUAL |
| 192.168.5.1 | 255.255.255.0 | 00:30:00:00:00:03 | R2 | R2P3 | NO | GENERAL | VARIABLE | INDIVIDUAL |
| 192.168.6.1 | 255.255.255.0 | 00:30:00:00:00:04 | R2 | R2P4 | NO | GENERAL | VARIABLE | INDIVIDUAL |
| 192.168.3.10 | 255.255.255.0 | 00:40:00:00:00:01 | R3 | COMMON | NO | DEVICE-REPRESENTATIVE | VARIABLE | INDIVIDUAL |
| 192.168.9.1 | 255.255.255.0 | 00:40:00:00:00:01 | R3 | R3P1 | NO | GENERAL | VARIABLE | INDIVIDUAL |
| 192.168.3.10 | 255.255.255.0 | 00:40:00:00:00:02 | R3 | R3P2 | NO | GENERAL | VARIABLE | INDIVIDUAL |
| 192.168.8.10 | 255.255.255.0 | 00:40:00:00:00:03 | R3 | R3P3 | NO | GENERAL | VARIABLE | INDIVIDUAL |
| 192.168.6.10 | 255.255.255.0 | 00:40:00:00:00:04 | R3 | R3P4 | NO | GENERAL | VARIABLE | INDIVIDUAL |
| 192.168.5.10 | 255.255.255.0 | 00:20:00:00:00:01 | R4 | COMMON | NO | DEVICE-REPRESENTATIVE | VARIABLE | INDIVIDUAL |
| 192.168.7.1 | 255.255.255.0 | 00:20:00:00:00:01 | R4 | R4P1 | NO | GENERAL | VARIABLE | INDIVIDUAL |
| 192.168.5.10 | 255.255.255.0 | 00:20:00:00:00:02 | R4 | R4P2 | NO | GENERAL | VARIABLE | INDIVIDUAL |
| 192.168.8.1 | 255.255.255.0 | 00:20:00:00:00:03 | R4 | R4P3 | NO | GENERAL | VARIABLE | INDIVIDUAL |

FIG.12

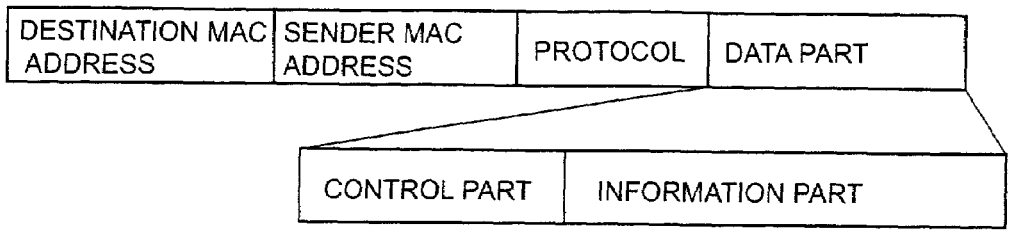

| DESTINATION MAC ADDRESS | CONTROL PART | INFORMATION PART |
|---|---|---|
| BROADCAST | PARENT ROUTER INQUIRY REQUEST | DEVICE-REPRESENTATIVE MAC ADDRESS |
| UNICAST | PARENT ROUTER INQUIRY RESPONSE | RESPONDING DEVICE PARENT ROUTER IP ADDRESS<br>RESPONDING DEVICE PARENT ROUTER MAC ADDRESS<br>RESPONDING DEVICE IP ADDRESS<br>RESPONDING DEVICE NETWORK MASK<br>RESPONDING DEVICE MAC ADDRESS<br>RESPONDING DEVICE REPRESENTATIVE MAC ADDRESS |
| BROADCAST | SUBORDINATE DEVICE DETECTION REQUEST | SENDER PARENT ROUTER IP ADDRESS<br>SENDER PARENT ROUTER MAC ADDRESS<br>SENDER IP ADDRESS<br>SENDER NETWORK MASK<br>SENDER MAC ADDRESS |
| UNICAST | SUBORDINATE DEVICE DETECTION RESPONSE | IP ADDRESS SETTING CONDITION<br>RESPONDING DEVICE PARENT ROUTER IP ADDRESS<br>RESPONDING DEVICE PARENT ROUTER MAC ADDRESS<br>RESPONDING DEVICE IP ADDRESS<br>RESPONDING DEVICE NETWORK MASK |
| UNICAST | SUBORDINATE DEVICE SETTING REQUEST | SENDER PARENT ROUTER IP ADDRESS<br>SENDER PARENT ROUTER MAC ADDRESS<br>SENDER IP ADDRESS<br>SENDER NETWORK MASK<br>SET IP ADDRESS<br>DHCP OPERATION MODE |
| UNICAST | SUBORDINATE DEVICE SETTING RESPONSE | SENDER IP ADDRESS SETTING RESULT<br>SENDER PARENT ROUTER IP ADDRESS<br>SENDER PARENT ROUTER MAC ADDRESS<br>SENDER REPRESENTATIVE IP ADDRESS<br>SENDER REPRESENTATIVE MAC ADDRESS<br>SENDER PORT IP ADDRESS<br>RESPONDING DEVICE PORT MAC ADDRESS<br>RESPONDING DEVICE IDENTIFICATION INFORMATION<br>RESPONDING DEVICE PORT IDENTIFICATION INFORMATION |

FIG.13

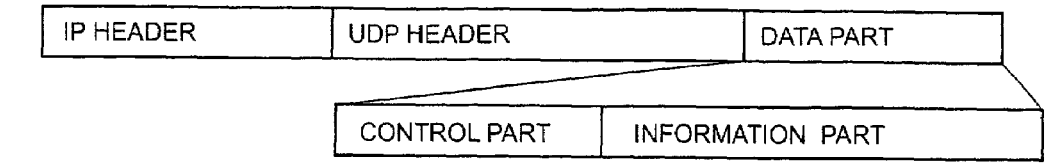

| IP HEADER | UDP HEADER | DATA PART |

| CONTROL PART | INFORMATION PART |

| CONTROL PART | INFORMATION PART |
|---|---|
| ADDRESS INFORMATION DETERMINATION AUTHORITY ACQUISITION REQUEST | DEVICE-REPRESENTATIVE IP ADDRESS OF ITS OWN |
| ADDRESS INFORMATION DETERMINATION AUTHORITY ACQUISITION RESPONSE | ACQUISITION RESULT |
| ADDRESS INFORMATION DETERMINATION AUTHORITY ACQUISITION RELEASE REQUEST | DEVICE-REPRESENTATIVE IP ADDRESS OF ITS OWN |
| ADDRESS INFORMATION DETERMINATION AUTHORITY ACQUISITION RELEASE RESPONSE | ACQUISITION RELEASE RESULT |
| ADDRESS INFORMATION TRANSMISSION REQUEST | DEVICE-REPRESENTATIVE IP ADDRESS OF ITS OWN |
| ADDRESS INFORMATION TRANSMISSION RESPONSE | ADDRESS INFORMATION |
| ADDRESS INFORMATION UPDATE NOTICE | ADDRESS INFORMATION DEVICE-REPRESENTATIVE IP ADDRESS |
| ADDRESS INFORMATION UPDATE RESPONSE | UPDATE RESULT |
| ADDRESS INFORMATION TRANSFER NOTICE | ADDRESS INFORMATION DEVICE-REPRESENTATIVE IP ADDRESS |
| ADDRESS INFORMATION TRANSFER RESPONSE | DEVICE-REPRESENTATIVE IP ADDRESS |
| ALL NETWORK ADDRESSES CHANGE NOTICE | PARENT ROUTER IP ADDRESS PARENT ROUTER MAC ADDRESS |
| ADDRESS DETERMINATION AUTHORITY MANAGEMENT AUTHORITY REQUEST | SENDER DEVICE-REPRESENTATIVE IP ADDRESS |
| ADDRESS DETERMINATION AUTHORITY MANAGEMENT AUTHORITY RESPONSE | RESPONDING DEVICE DEVICE-REPRESENTATIVE IP ADDRESS |
| ADDRESS EXHAUSTION NOTICE | SENDER DEVICE-REPRESENTATIVE IP ADDRESS PORT INFORMATION |
| ADDRESS EXHAUSTION NOTICE RESPONSE | NONE |
| HEALTH CHECK REQUEST | NONE |
| HEALTH CHECK RESPONSE | NONE |
| AUTHORITY INFORMATION COLLECTION REQUEST | SENDER DEVICE-REPRESENTATIVE IP ADDRESS |
| AUTHORITY INFORMATION COLLECTION RESPONSE | RESPONDING DEVICE DEVICE-REPRESENTATIVE IP ADDRESS ADDRESS DETERMINATION AUTHORITY ACQUISITION IDENTIFIER |
| NEXT PARENT ROUTER REQUEST | SENDER DEVICE-REPRESENTATIVE IP ADDRESS |
| NEXT PARENT ROUTER RESPONSE | PARENT ROUTER IP ADDRESS PARENT ROUTER MAC ADDRESS |
| PARENT ROUTER CHANGE REQUEST | PARENT ROUTER IP ADDRESS PARENT ROUTER MAC ADDRESS |
| PARENT ROUTER CHANGE RESPONSE | RESPONDING DEVICE DEVICE-REPRESENTATIVE IP ADDRESS |
| ADDRESS RESET NOTICE | PARENT ROUTER IP ADDRESS PARENT ROUTER MAC ADDRESS |
| ADDRESS RESET RESPONSE | DEVICE-REPRESENTATIVE IP ADDRESS |

FIG.18

| IP ADDRESS | NETWORK MASK | MAC ADDRESS | ROUTER IDENTIFICATION | PORT IDENTIFICATION | EXTERNAL ENTRY | AUTHORITY TYPE | GENERATION TYPE | DHCP OPERATION |
|---|---|---|---|---|---|---|---|---|
| 192.200.1.1 | 255.255.255.0 | 00:10:00:00:00:01 | R1 | COMMON | NO | PARENT ROUTER/DEVICE-REPRESENTATIVE | CONFIGURATION | INDIVIDUAL |
| 192.200.1.1 | 255.255.255.0 | 00:10:00:00:00:01 | R1 | R1P1 | NO | GENERAL | CONFIGURATION | INDIVIDUAL |
| 192.168.1.1 | 255.255.255.0 | 00:10:00:00:00:02 | R1 | R1P2 | NO | GENERAL | VARIABLE | INDIVIDUAL |
| 192.168.2.1 | 255.255.255.0 | 00:10:00:00:00:03 | R1 | R1P3 | NO | GENERAL | VARIABLE | INDIVIDUAL |
| 192.168.3.10 | 255.255.255.0 | 00:20:00:00:00:01 | R2 | COMMON | NO | DEVICE-REPRESENTATIVE | VARIABLE | INDIVIDUAL |
| 192.168.3.1 | 255.255.255.0 | 00:20:00:00:00:01 | R2 | R2P1 | NO | GENERAL | VARIABLE | INDIVIDUAL |
| 192.168.1.10 | 255.255.255.0 | 00:20:00:00:00:02 | R2 | R2P2 | NO | GENERAL | VARIABLE | INDIVIDUAL |
| 192.168.4.1 | 255.255.255.0 | 00:20:00:00:00:03 | R2 | R2P3 | NO | GENERAL | VARIABLE | INDIVIDUAL |
| 192.168.5.1 | 255.255.255.0 | 00:20:00:00:00:04 | R2 | R2P4 | NO | GENERAL | VARIABLE | INDIVIDUAL |
| 192.168.8.1 | 255.255.255.0 | 00:30:00:00:00:01 | R3 | COMMON | NO | DEVICE-REPRESENTATIVE | VARIABLE | INDIVIDUAL |
| 192.168.8.1 | 255.255.255.0 | 00:30:00:00:00:01 | R3 | R3P1 | NO | GENERAL | VARIABLE | INDIVIDUAL |
| 192.168.2.10 | 255.255.255.0 | 00:30:00:00:00:02 | R3 | R3P2 | NO | GENERAL | VARIABLE | INDIVIDUAL |
| 192.168.7.10 | 255.255.255.0 | 00:30:00:00:00:03 | R3 | R3P3 | NO | GENERAL | VARIABLE | INDIVIDUAL |
| 192.168.5.10 | 255.255.255.0 | 00:30:00:00:00:04 | R3 | R3P4 | NO | GENERAL | VARIABLE | INDIVIDUAL |
| 192.168.4.10 | 255.255.255.0 | 00:10:00:00:00:11 | R4 | COMMON | NO | DEVICE-REPRESENTATIVE | VARIABLE | INDIVIDUAL |
| 192.168.6.1 | 255.255.255.0 | 00:10:00:00:00:11 | R4 | R4P1 | NO | GENERAL | VARIABLE | INDIVIDUAL |
| 192.168.4.10 | 255.255.255.0 | 00:10:00:00:00:12 | R4 | R4P2 | NO | GENERAL | VARIABLE | INDIVIDUAL |
| 192.168.7.1 | 255.255.255.0 | 00:10:00:00:00:13 | R4 | R4P3 | NO | GENERAL | VARIABLE | INDIVIDUAL |

COMMUNICATION DEVICE FOR AUTOMATICALLY SETTING A ROUTER CONFIGURATION AND METHOD OF CONTROLLING THE DEVICE

BACKGROUND OF THE INVENTION

1. Field of the Invention

The present invention relates to communication devices and methods of controlling the same, and more particularly to a communication device for automatically setting a router configuration on a network formed by a plurality of routers and a method of controlling such a communication device.

2. Description of the Related Art

Conventionally, it has been required to provide each port of routers with a different address in constructing a network. Further, each terminal should be provided with a host address in a network address set for each port of the routers.

For instance, as a method of setting the IP address of a terminal, an automatic setting using a DHCP (Dynamic Host Configuration Protocol, RFC2131) server is known. However, it is common that the host address of the DHCP server itself is set in accordance with a network address of each port of the routers which network address is preset manually.

Japanese Patent No. 2679613 discloses a circuit for automatically setting a network address. According to this circuit, an unused address is obtained based on path information on the premise of receiving the path information, and addresses are not automatically settable from a state without any address setting.

In the case of using conventional routers, only the IP addresses of terminals are automatically settable by means of a DHCP server. However, all the ports of the routers on a network should be assigned different network addresses and the network addresses should be decided so as to be consistent with the DHCP server. Therefore, in the case of a large-scale network using a plurality of routers, the routers should be set manually, thus requiring a lot of work in setting the routers and terminals and performing a check operation for finding setting errors.

The circuit disclosed in the above-mentioned Japanese Patent No. 2679613 is based on the premise that the addresses of router devices are preset so that path information transmitted on a network is receivable, and is prevented from constructing a new network from a state without any address setting or resetting the network addresses of its own devices.

SUMMARY OF THE INVENTION

It is a general object of the present invention to provide a communication device and a method of controlling the same in which the above-described disadvantage is eliminated.

A more specific object of the present invention is to provide a communication device for automatically setting a configuration including router addresses by automatically determining different addresses for interlinked routers on a network and further for automatically constructing the network without setting addresses for devices on the network by avoiding a complicated network setting by linking setting information with the network address of each port in communication with a server.

The above objects of the present invention are achieved by a communication device including: a first part transmitting information to and receiving information from an adjacent device; a second part managing address information of all mounting ports of the communication device, a first port of the adjacent device, and a network to be constructed, the first port being connected to the communication device; a third part automatically determining addresses for the mounting ports of the communication device and the first port of the adjacent device so that the addresses are not duplicated; and a fourth part managing address determination authority in determining the addresses.

The above objects of the present invention are also achieved by a communication device control method comprising the step of (a) determining automatically addresses for all mounting ports of a communication device having address determination authority to determine the addresses and a first port of an adjacent device connected to the communication device through the first port so that the addresses are not duplicated, wherein address information of the mounting ports of the communication device, the first port the adjacent device, and a network to be constructed is managed, the network including the communication device and the adjacent device.

According to the above-described communication device and communication device control method, the addresses are automatically determined for the mounting ports of the communication device and the first port of the adjacent device and the address determination authority for determining the addresses is managed. Therefore, the addresses of the communication device can be set automatically and the network can be constructed automatically.

BRIEF DESCRIPTION OF THE DRAWINGS

Other objects, features and advantages of the present invention will become more apparent from the following detailed description when read in conjunction with the accompanying drawings, in which:

FIG. 11 is a diagram showing address information concerning the network of FIG. 2;

FIGS. 12 and 13 are diagrams showing signal frame formats employed in the first and other embodiments of the present invention;

FIG. 18 is a diagram showing address information employed in a fourth embodiment of the present invention;

DETAILED DESCRIPTION OF THE PREFERRED EMBODIMENTS

A description will now be given, with reference to the accompanying drawings, of embodiments of the present invention.

Figure 1:
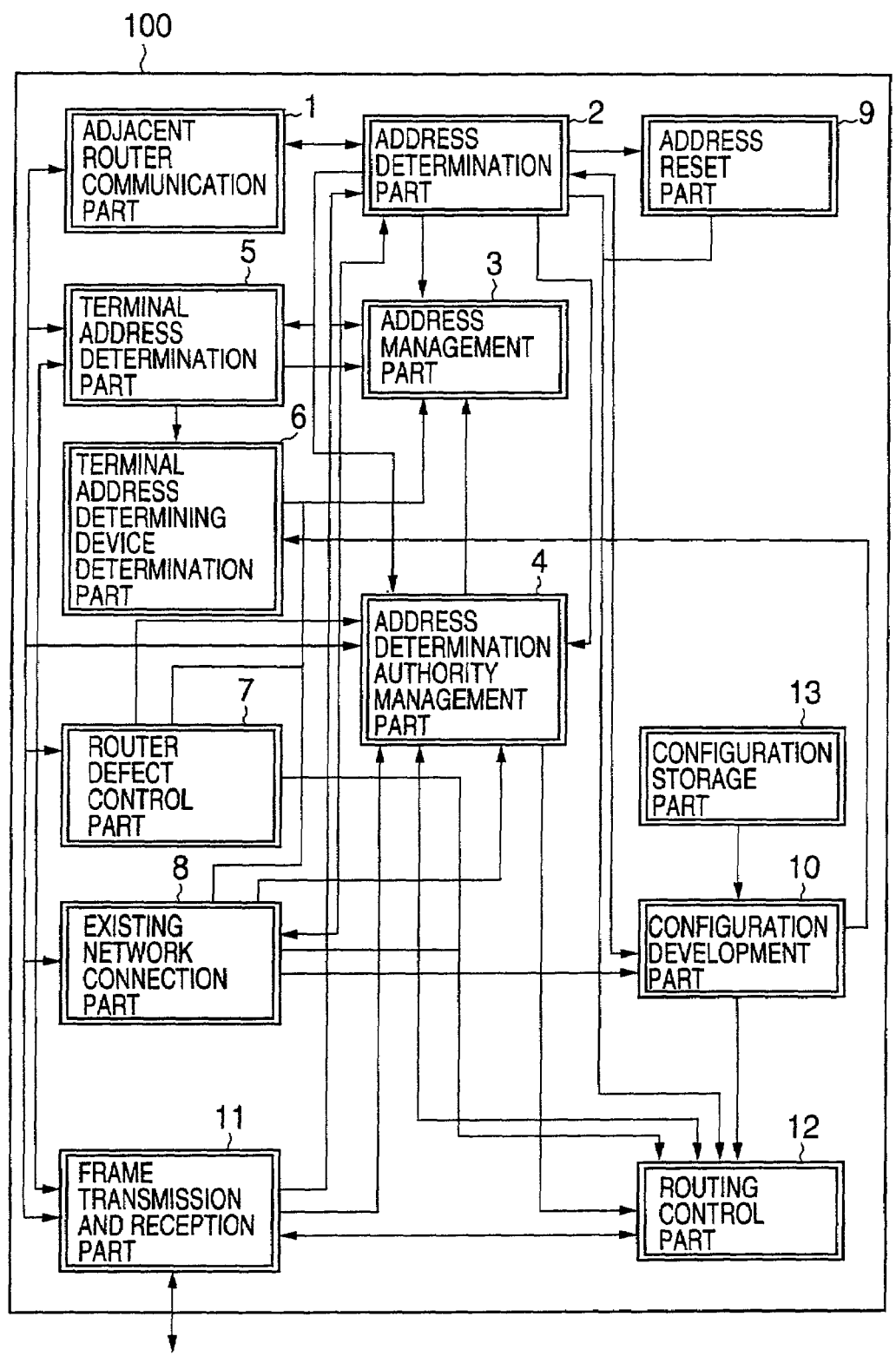
FIG. 1 is a diagram showing a principle of the present invention.

FIG. 1 is a block diagram showing a structure of a communication device 100 based on the principle of the present invention. In the drawing, parts newly introduced in the present invention to a conventional communication device are indicated by blocks formed by double lines.

An adjacent router communication part 1 transmits a frame to and receives a frame from an adjacent device.

An address determination part 2 automatically determines the addresses of all the subject mounting ports of the communication device 100 and an adjacent port of the adjacent device which adjacent port is connected to the communication device 100 so that the addresses are not duplicated, that is, the addresses are different from one another. Normally, the mounting ports are for the entire communication device 100, but may be for a part thereof.

An address management part 3 manages and controls the determined address information of the mounting ports of the communication device 100, the adjacent port of the adjacent device, and a network to be constructed.

An address determination authority management part 4 manages and controls authority to determine the addresses.

A terminal address determination part 5, in response to an address acquisition request from a terminal connected to the communication device 100, automatically determines an address for the terminal by selecting, based on the address of a port of the communication device 100 to which port the terminal is connected, an unused one from addresses on a network including the port. Thereby, the terminal is set operable without setting the address of each terminal under the network.

An address reset part 9 enables a reset of addresses for the devices by informing a parent router of an address exhaustion condition if settable addresses are exhausted in the address determination part 2.

An existing network connection part 8 enables connection between the network constructed by dynamic address assignment in the present invention and an existing network constructed by static address assignment based on configuration information.

A configuration development part 10 constructs the configuration information of the communication device 100 based on configuration information including address information defined with respect to each preset port. A configuration storage part 13 for storing configuration information is connected to the configuration development part 10.

A router defect control part 7 performs redundancy configuration control by performing defect control of a router that manages address determination authority if a defect occurs in the router.

A terminal address determining device determination part 6 determines a device that can perform centralized management of a terminal address setting on the network so that the terminal address setting is not performed by each individual device.

Next, a description will be given of an operation of the communication device 100.

The adjacent router communication part 1 receives an information frame and transmits the frame to the address determination part 2. The address determination part 2 performs a required operation depending on the contents of the frame. In determining the addresses of all the mounting ports of the communication device 100 and the adjacent port of the adjacent device, the address determination part 2 acquires address determination authority from the address determination authority management part 4 and obtains address information from the address management part 3. Then, the address determination part 2 determines the addresses so that the addresses are not duplicated. Information on the determined addresses is transmitted to the address management part 3. This address information is managed by the address management part 3. When address determination is completed, the address determination authority management part 4 releases the address determination authority.

An initial address is determined by using an initial value. In the case of the IP, the initial address is determined by using the address/network mask of a local address. This determination operation corresponds to an operation of determining first an address marked by a star in address information shown in FIG. 11. FIG. 11 is a diagram illustrating the address information including IP addresses (network addresses) automatically determined in a sequence described below in a later described first embodiment of the present invention. The address information includes the IP addresses, the network mask, MAC addresses, router identification information, port identification information, external entry allowability, authority types (parent and/or device-representative or general router), generation types (configuration compliant or variable (automatically settable)) and DHCP operation information (a later described individual operation of FIG. 21 or collective management of FIG. 22).

If there is an information transmission request to the adjacent device, the address determination part 2 requests the adjacent router communication part 1 to transmit information, and the adjacent router communication part 1 transmits frames to the adjacent device.

Thereby, addresses are exchanged among the devices so that the automatic addressing of the network addresses of the devices on the network can be performed.

In the above-described operation, when the addresses of the ports are determined, the address determination part 2 calls the terminal address determination part 5, thereby making valid each terminal address determination operation for a corresponding one of the ports. Upon receiving an address request from a terminal on a network to which a port is connected, the terminal address determination part 5 transmits a non-duplicated address on the network to which the port is connected to the requesting terminal. Thereby, the terminal is set operable without the address of each terminal under the network.

In the above-described operation, the address determination part 2 notifies the address reset part 9 of an occurrence of address exhaustion if unused addresses run out at a time of address determination. The address reset part 9 notifies the parent router of the occurrence of address exhaustion and an information factor.

The parent router transmits received frames to the address determination part 2. The address determination part 2 detects the occurrence of address exhaustion by the received frames and determines the next address system from the information factor. In the case of a network constructed based on the IP, different network addresses are employed, or the mask width of the network is changed. The address determination part 2 reconstructs the network based on the new address system.

In the above-described operation, the configuration development part 10 constructs the configuration information of the communication device 100 based on the configuration information. The address determination part 2 is allowed to recognize the configuration of statically set address information and set the addresses by the configuration development part 10 informing the address determination part 2 of the configuration information including the address information defined in advance with respect to the ports. Thereby, the configuration information of the communication device 100 can flexibly be constructed.

In the above-described operation, the router defect control part 7 of each subordinate device periodically monitors the parent router. If the router defect control part 7 of any subordinate router detects the occurrence of a defect in the parent router (a device managing the address determination authority), the router defect control part 7 transmits frames and receives responses so as to detect any other subordinate devices ready for communication. The responses are transmitted to the router defect control part 7 and the next parent router is selected from among responding subordinate devices. Then, the router defect control part 7 transmits to the selected subordinate device a request to become the next parent router. The subordinate device receiving the request can be the parent router thereafter. Thereby, the redundancy configuration of the parent router can be realized.

In the above-described operation, the terminal address determining device determination part 6 receives from the configuration development part 10 information on terminal address setting conditions (information as to whether to perform a terminal address determination operation or a relay operation to another device that performs the terminal address determination operation). The terminal address determining device determination part 6 causes the address management part to record the setting contents in the address information.

In determining the addresses of the ports, the address determination part 2 notifies the terminal address determination part 5 of the terminal address setting conditions. The terminal address determination part 5, based on the terminal address setting conditions, makes valid a terminal address setting operation or requests the terminal address determining device determination part 6 to establish tunnel connection.

The terminal address determination part 5 requests either one of the above-described operations to be performed. By exchanging with the address management part 3 information as to whether each device makes valid the terminal address setting operation or performs the relay operation to another device that performs the terminal address determination operation, the terminal address determination part 5 can perform centralized management as to which of the operations each device on the network performs.

[First Embodiment]

A description will next be given of the first embodiment of the present invention.

Figure 2:
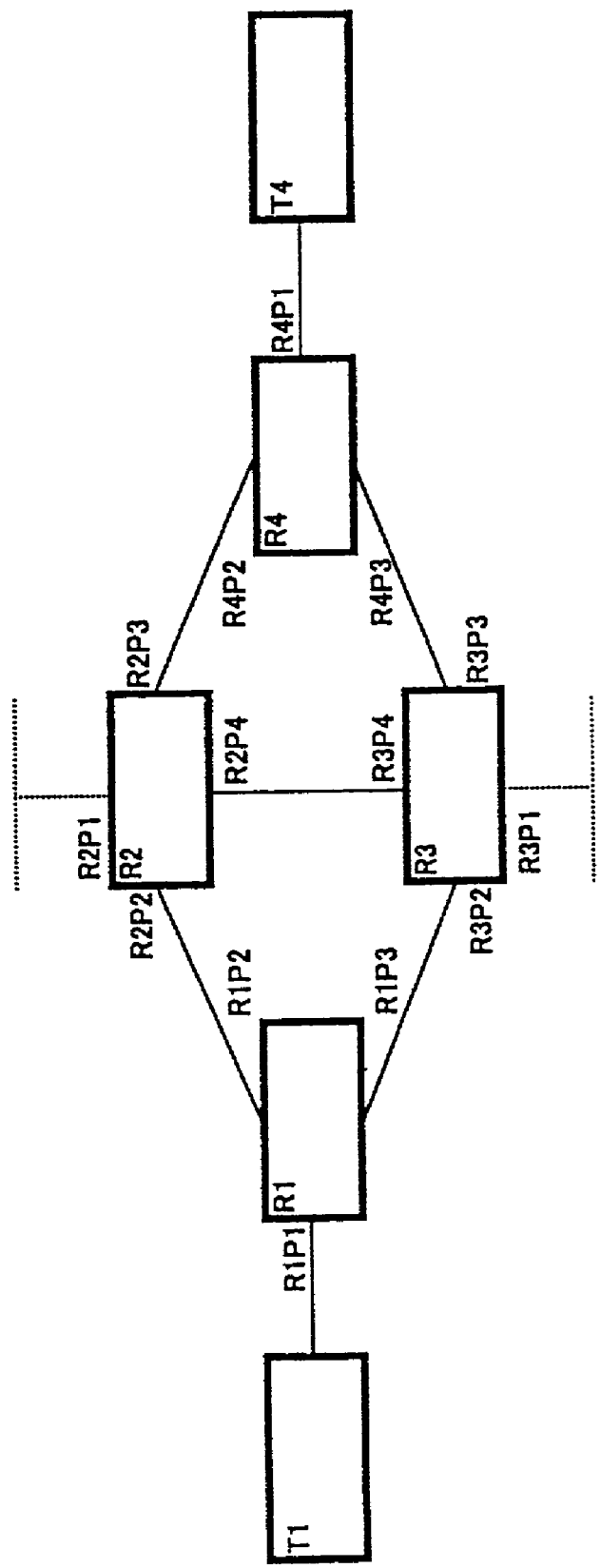
FIG. 2 is a block diagram showing a structure of a network including communication devices according to a first embodiment of the present invention.

FIG. 2 is a block diagram showing a structure of a network to which the present invention is applied. This network is an IP network including terminals T1 and T4 and routers R1 through R4. Hereinafter, a terminal is referred to by Tn where n indicates a terminal identification number. Further, a router and its port are referred to by RxPy where x indicates a router identification number and y indicates a port number. For instance, the router R3 includes four ports of R3P1, R3P2, R3P3, and R3P4. Each of the routers R1 through R4 has the structure of the communication device 100 of FIG. 1.

In the following description, a router managing the address determination authority is referred to as a parent router. In order to determine parent-subordinate relations among devices (routers), the MAC address (see FIG. 11) managed by each device is employed as a determination factor in determining the parent-subordinate relation of each device. This relation corresponds to a priority in the structure shown in FIG. 2.

Next, a description will be given, with reference to FIGS. 3 through 10 in addition to FIGS. 1 and 2, an automatic address setting operation of the network of FIG. 2.

Figure 3:
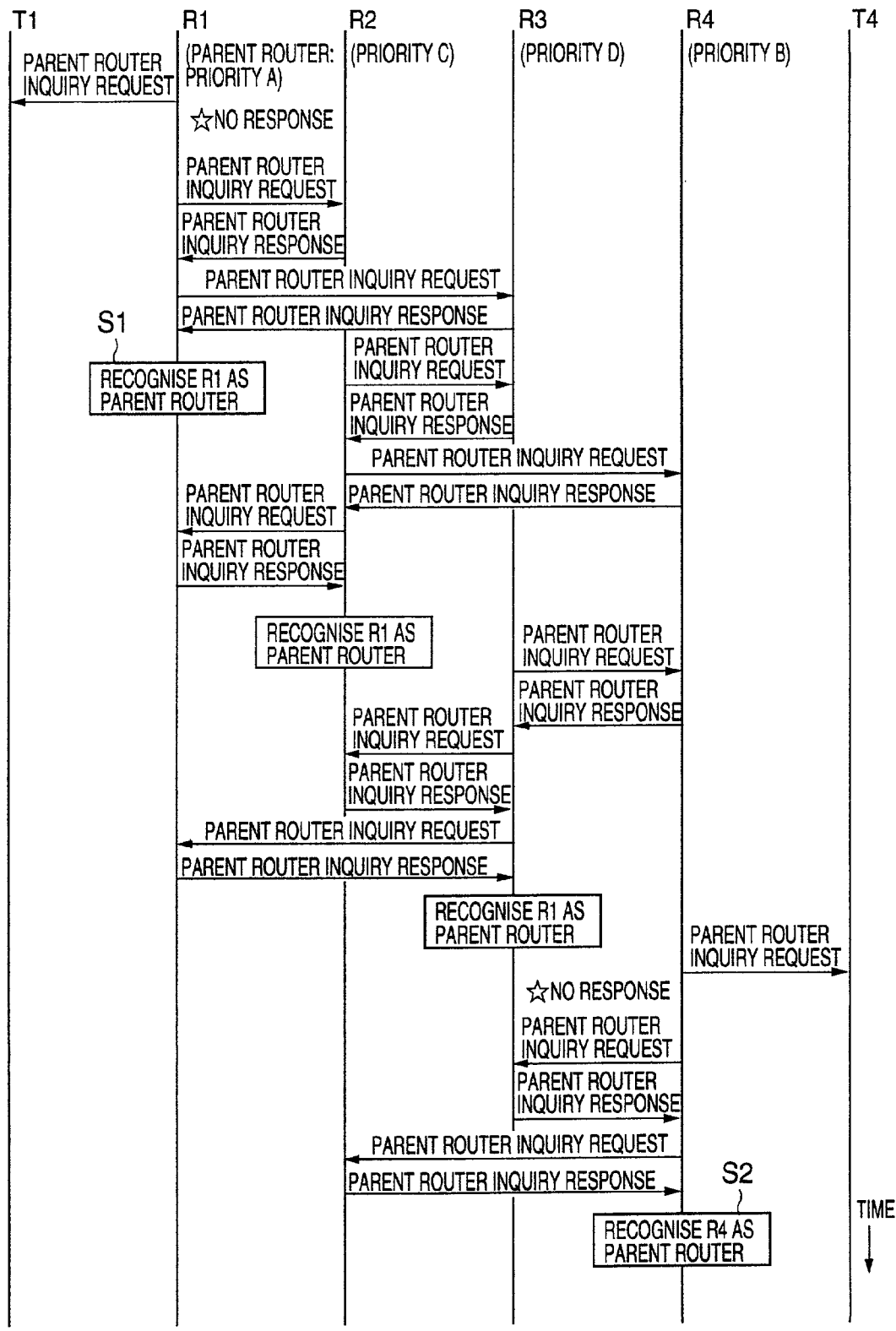
FIGS. 3 through 10 are diagrams showing a communication sequence on the network of FIG. 2.

In FIG. 3, when the routers R1, R2, R3, and R4 are turned on in the order described, each of the routers R1 through R4 has its address determination part 2 cause the adjacent router communication part 1 to successively transmit a "parent router inquiry request" to all its mounting ports by MAC broadcast so as to determine whether its adjacent devices (routers) are in compliance with the present invention.

On receiving the "parent router inquiry request", each of the routers R1 through R4 has its adjacent router communication part 1 inform the address determination part 2 of the reception of the request.

Each of the routers R1 through R4 has its address determination part 2 edit parent router information under its own management and has its adjacent router communication part 1 transmit a "parent router inquiry response".

On receiving the "parent router inquiry response", each of the routers R1 through R4 has its adjacent router communication part 1 inform the address determination part 2 of the reception of the response.

By receiving the responses, each of the routers R1 through R4 has its address determination part recognize that its adjacent devices comply with the present invention to check the priorities of its own and the adjacent devices based on received information. It is judged that a device having a smaller MAC address has a higher priority. In this embodiment, the routers R1 and R4 are recognized as parent routers in steps S1 and S2 of FIG. 3, respectively.

Figure 4:
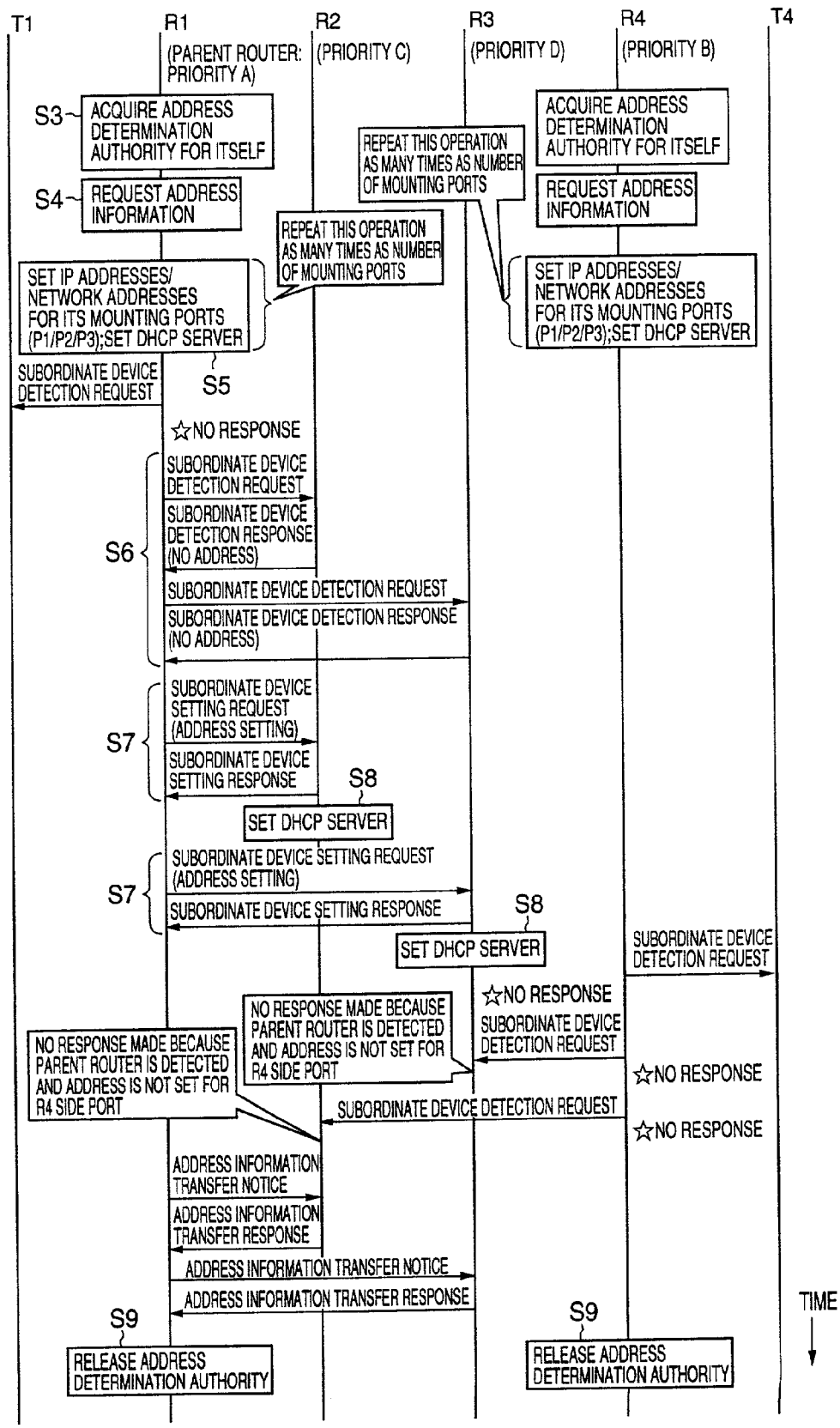

Next, in step S3 of FIG. 4, the address determination part 2 of the parent router R1 causes the address determination authority management part 4 to acquire the address determination authority for the parent router R1, and in step S4, the address determination part 2 obtains the latest address information. Then, in step S5, the address determination part 2 determines the IP addresses of all the mounting ports of the parent router R1 based on the obtained address information so that the addresses are not duplicated, notifies the address management part 3 of the determined addresses, and requests the terminal address determination part 6 to set a DHCP function for each port.

In step S6, the address determination part 2 of the parent router R1 causes the adjacent router communication part 1 to transmit a "subordinate device detection request" to all the mounting ports of the parent router R1 by MAC broadcast. The adjacent router communication part 1 of each of the routers R2 and R3 transmits the received "subordinate device detection request" to the address determination part 2. The address determination part 2 of each of the routers R2 and R3 checks the contents of the received information and the setting information of a mounting port that has received the request. Since the mounting port is not assigned an address, the address determination part 2 edits an IP address setting condition (no address) and causes the adjacent router communication part 1 to transmit a "subordinate device detection response" to the parent router R1.

In step S7, the adjacent router communication part 1 of the parent router R1 notifies the address determination part 2 of the received "subordinate device detection responses". Through the received information, the address determination part 2 recognizes the devices without addresses (the routers R2 and R3). Then, with respect to each of the routers R2 and R3, the address determination part 2 selects one of IP addresses on a network including a port to which a corresponding one of the routers R2 and R3 is connected and notifies the address management part 3 of the addresses. At the same time, the address determination part 2 of the parent router R1 causes the adjacent router communication part 1 to transmit a "subordinate device setting request" to each of the routers R2 and R3 to request the corresponding port of each of the routers R2 and R3 to set the IP address.

In step S8, the adjacent router communication part 1 of each of the routers R2 and R3 transmits the received "subordinate device setting request" to the address determination part 2. The address determination part 2 sets the IP address for the mounting port that has received this request based on the received information and notifies the address management part 3 of the IP address. The address determination part 2 requests the terminal address determination part 5 to set the DHCP function for each port. Then, the address determination part 2 causes the adjacent router communication part 1 to transmit a "subordinate device setting response" to the parent router R1 (step S7).

In step S9, the adjacent router communication part 1 of the parent router R1 transmits the received "subordinate device setting responses" to the address determination part 2 of the parent router R1. The address determination part 2 causes the address determination authority management part 4 to release the address determination authority.

Figure 5:
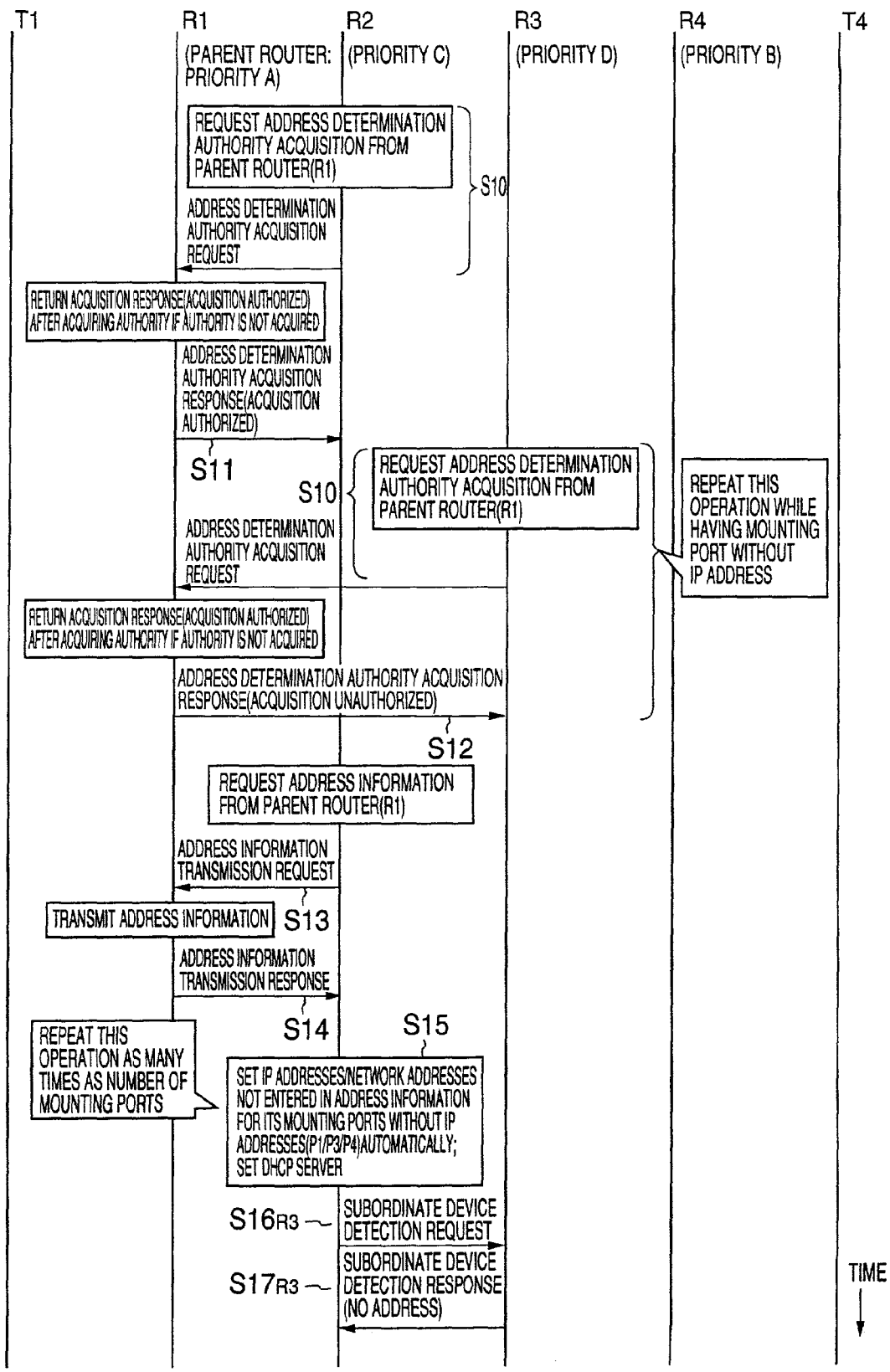

In step S10 of FIG. 5, each of the routers R2 and R3 causes its address determination part 2 to transmit an "address determination authority acquisition request" to the parent router R1 via a routing control part 12 of each of the routers R2 and R3 to perform an address determination authority acquisition operation if at least one of its ports is assigned an IP address and a port without an IP address is detected. In this embodiment, the router R2 transmits the request earlier than the router R3.

The parent router R1 has the "address determination authority acquisition request" received via a frame transmission and reception part 11 and transmitted to the address determination authority management part 4.

In step S11, the address determination authority management part 4 of the parent router R1 checks the acquisition state of the address determination authority. If the address determination authority is not acquired, the address determination authority management part 4 changes the state to an acquired state and thereafter, transmits an "address determination authority acquisition response" (acquisition authorized) to the router R2 via the routing control part 12. In step S12, in response to the acquisition request from the router 3, the address determination authority management part 4 transmits an "address determination authority acquisition response" (acquisition unauthorized) to the router R3 via the routing control part 12 since the address determination authority has been acquired by the router R2.

The router R2 has the "address determination authority acquisition response" (acquisition authorized) received via the frame transmission and reception part 11 and transmitted to the address determination part 2.

In step S13, the address determination part 2 of the router R2 requests the transmission of the latest address information by transmitting an "address information transmission request" to the parent router R1 via the routing control part 12.

In step S14, the parent router R1 has the "address information transmission request" received via the frame transmission and reception part 11 and transmitted to the address management part 3. The address management part 3 of the parent router R1 transmits all the latest address information to the router R2 via the routing control part 12 as an "address information transmission response".

The router R3 has the "address determination authority acquisition response" (acquisition unauthorized) received via the routing control part 12 and transmitted to the address determination part 2. The address determination part 2 repeats the above-described operation periodically while the router R3 has a mounting port without an IP address.

In step S15, the address determination part 2 of the router R2 determines IP addresses for the ports of the router R2 without IP addresses based on the address information so that the IP addresses are not duplicated, and notifies the address management part 3 of the IP addresses. At the same time, the address determination part 2 requests the terminal address determination part 5 to set the DHCP function for each port.

Figure 6:
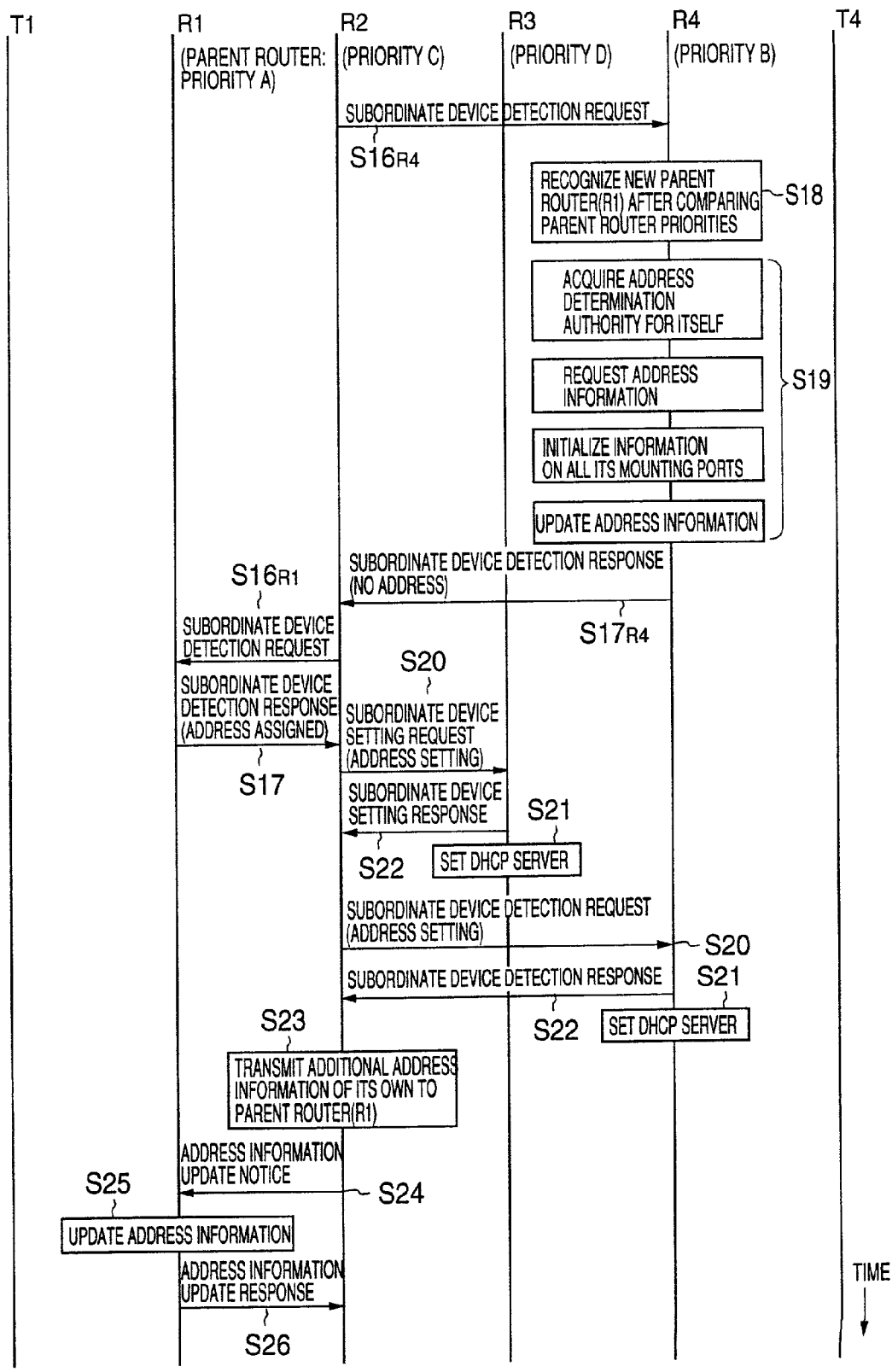

In steps $S16_{R3}$, $S16_{R4}$, and $S16_{R1}$ of FIGS. 5 and 6, the address determination part 2 of the router R2 causes the adjacent router communication part 1 to transmit a "subordinate device detection request" to all the port of the router R2.

The adjacent router communication part 1 of each of the routers R3 and R4 has the received "subordinate device detection request" transmitted to the address determination part 2.

In step $S17_{R3}$, the address determination part 2 of the router R3 checks the contents of the received information and the setting information of a mounting port that has received the request. Since the mounting port is not assigned an address, the address determination part 2 edits an IP address setting condition (no address) and causes the adjacent router communication part 1 to transmit a "subordinate device detection response" to the router R2.

In step S18 of FIG. 6, the address determination part 2 of the router R4 checks the contents of the received information and the setting information of a mounting port that has received the request. Since the mounting port is assigned with an IP address, the address determination part 2 performs a parent router priority check. In step S19, the address determination part 2 determines that the router R1 is a parent router having a higher priority than the router R4 and that the router R4 is the only device on a network including the router R4, and initializes the address information of the router R4. Thereafter, the address determination part 2 edits an IP address setting condition (no address). Then, in step $S17_{R4}$, the address determination part 2 of the router R4 causes the adjacent router communication part 1 to transmit a "subordinate device detection response" to the router R2. It is assumed that the router R4 is in operation as a parent router.

In step S20, through the received information, the address determination part 2 of the router R2 recognizes the devices having ports without addresses (the routers R3 and R4). Then, with respect to each of the routers R3 and R4, the address determination part 2 selects one of IP addresses on a network including a port to which a corresponding one of the routers R3 and R4 is connected and notifies the address management part 3 of the addresses. At the same time, the address determination part 2 of the router R2 causes the adjacent router communication part 1 to transmit a "subordinate device setting request" to each of the routers R3 and R4 to request the corresponding port of each of the routers R3 and R4 to set the IP address.

In step S21, the adjacent router communication part 1 of each of the routers R3 and R4 transmits the received "subordinate device setting request" to the address determination part 2. The address determination part 2 sets the IP address for the mounting port that has received this request based on the received information and notifies the address management part 3 of the IP address. The address determination part 2 requests the terminal address determination part 5 to set the DHCP function for each port. In step S22, the address determination part 2 of each of the routers R3 and R4 causes the adjacent router communication part 1 to transmit a "subordinate device setting response" to the router R2.

The adjacent router communication part 1 of the router R2 transmits the received "subordinate device setting responses" to the address determination part 2. In step S23, the address determination part 2 of the router R2 completes the setting of the IP addresses for all the mounting ports of the router R2 and the adjacent devices complying with the present invention, and thereafter, in step S24, updates the address information by transmitting the latest address information to the parent router R1 via the routing control part 12 as an "address information update notice".

The parent router R1 transmits the "address information update notice" received via the frame transmission and reception part 11 to the address management part 3. In step S25, the address management part 3 of the parent router R1 updates the address information under its own management based on the received address information, and in step S26, transmits an "address information update response" to the router R2 via the routing control part 12.

Figure 7:
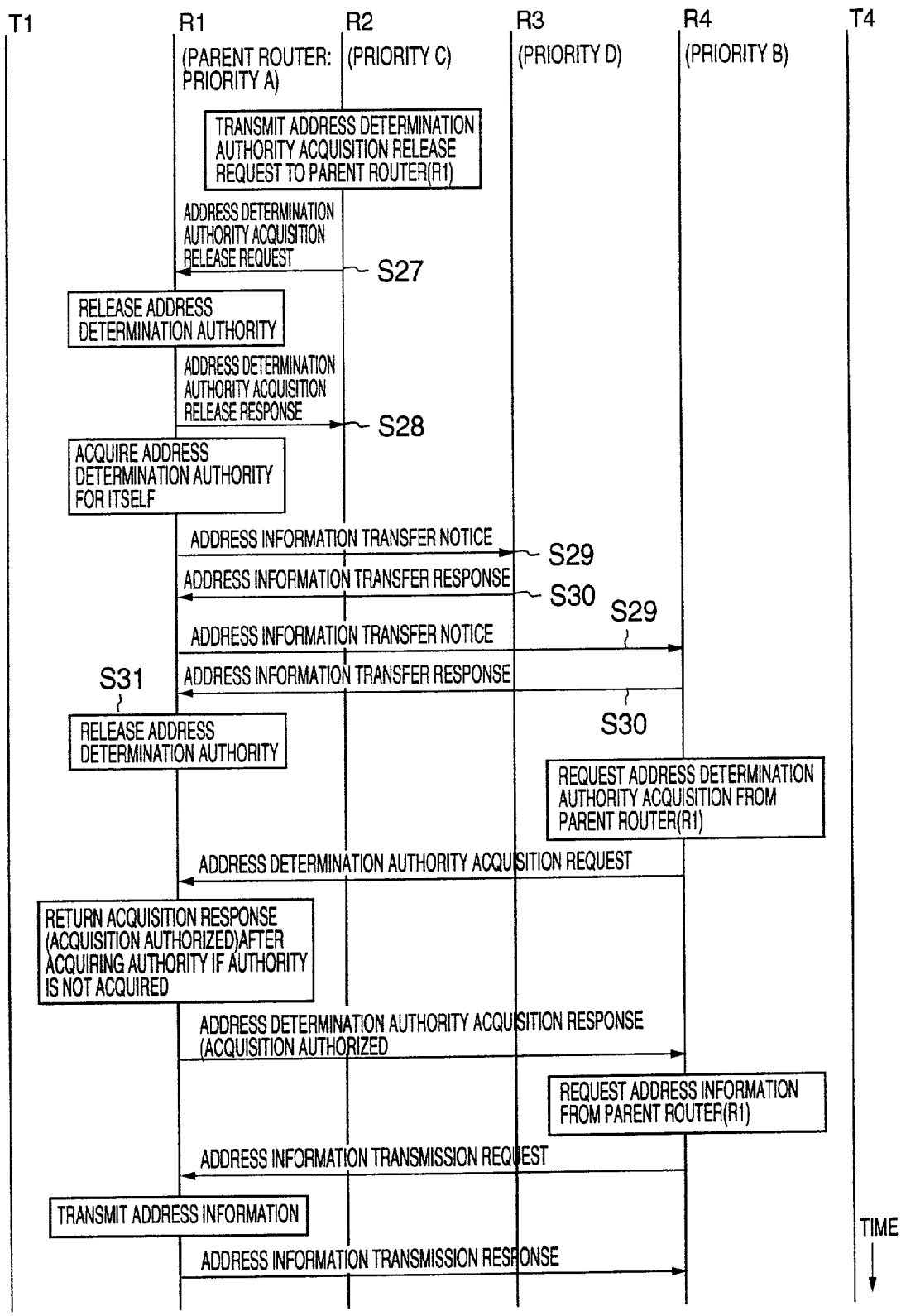
Figure 8:
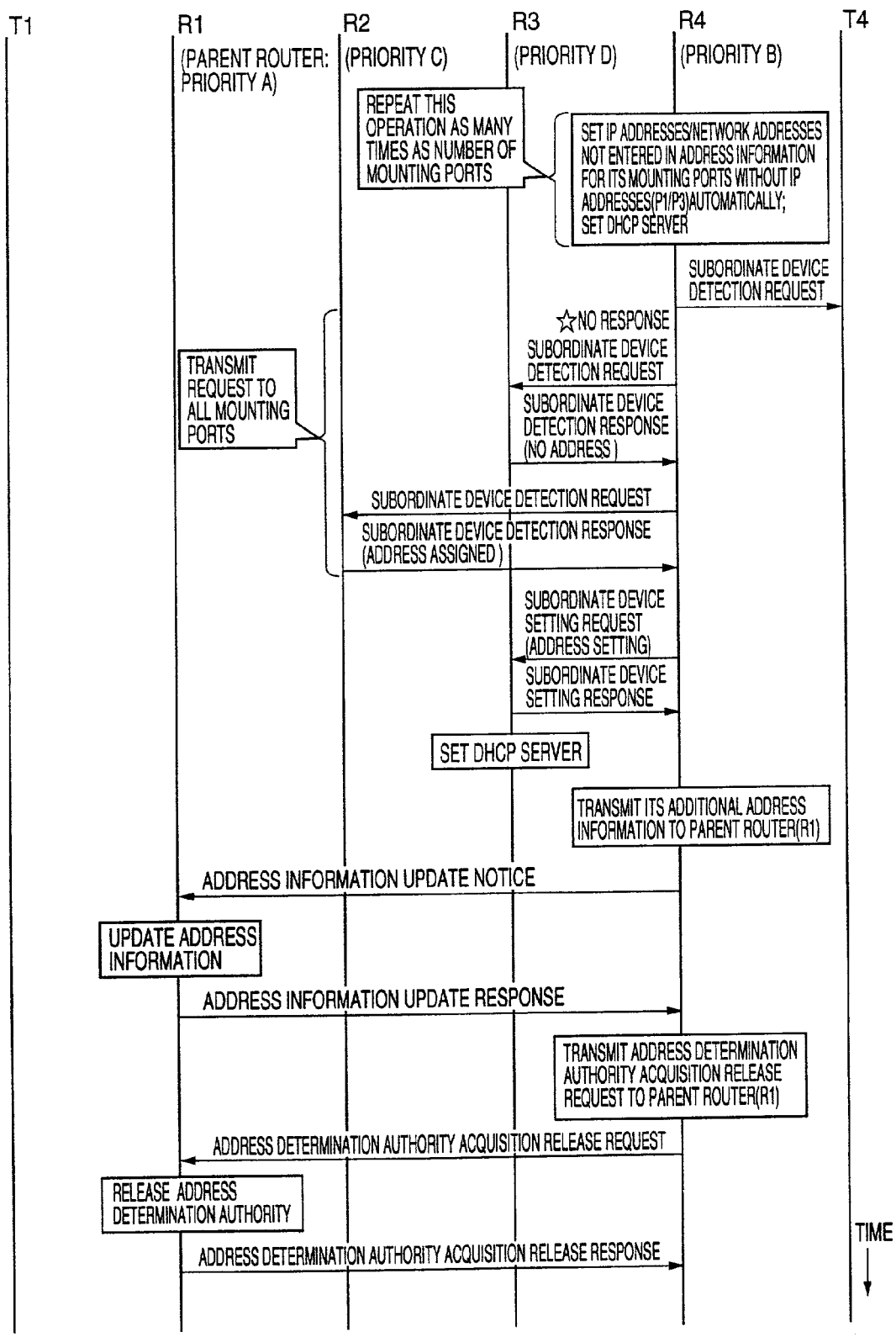
Figure 9:
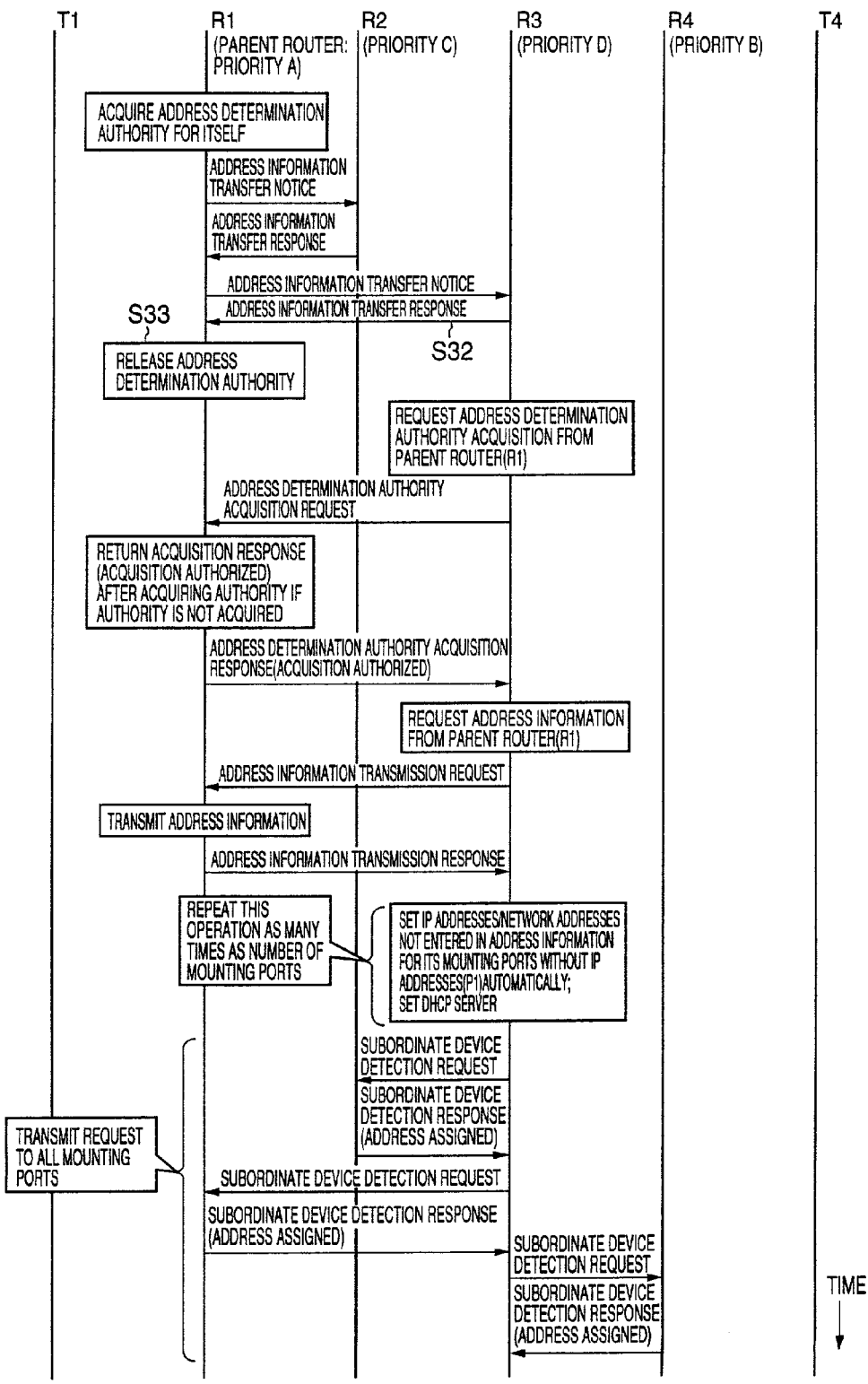
Figure 10:
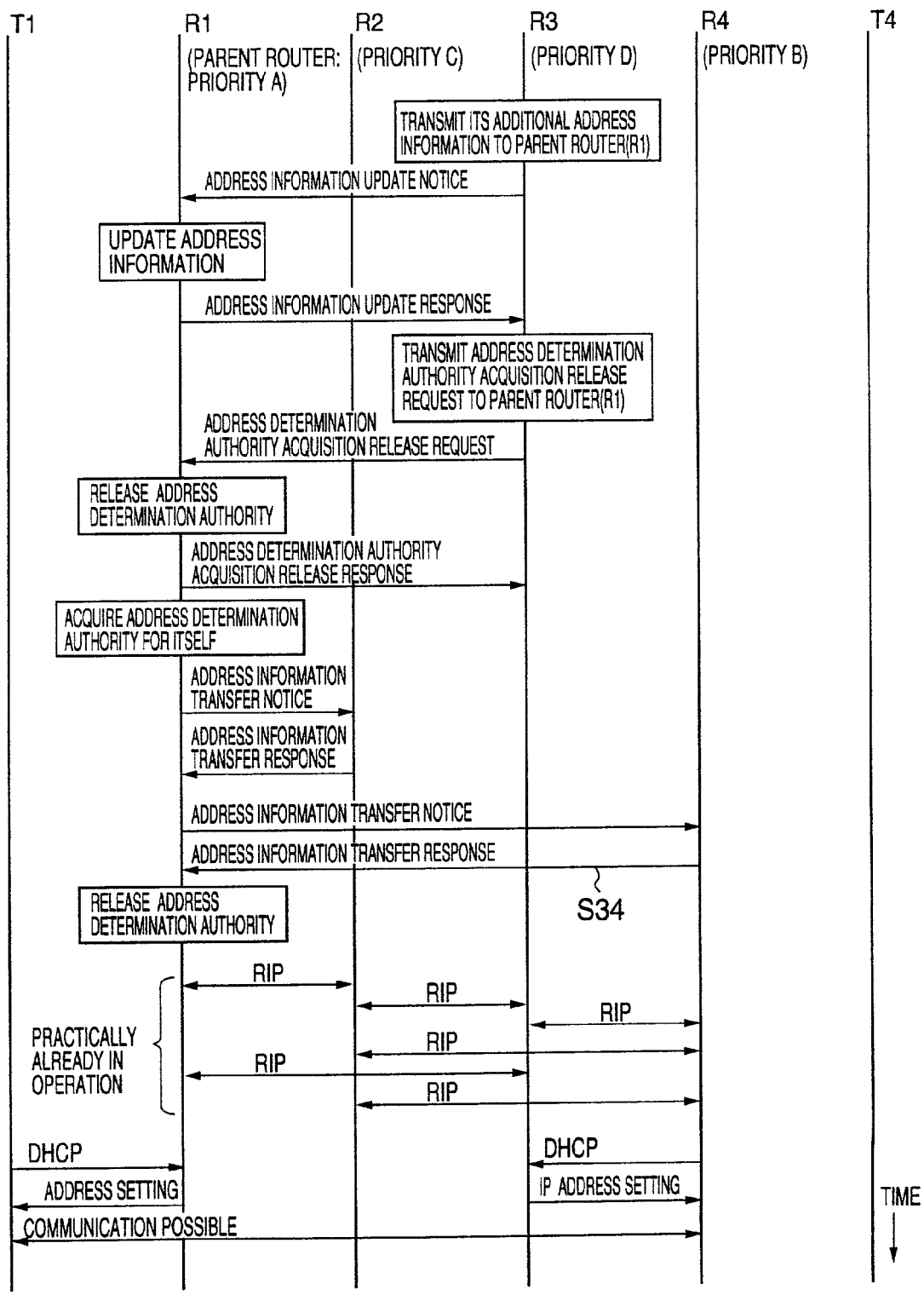

In step S27 of FIG. 7, the router R2 transmits the "address information update response" received via the frame transmission and reception part 11 to the address determination part 2. The address determination part 2 of the router R2 transmits an "address determination authority acquisition release request" to the parent router R1 via the routing control part 12.

In step S28, the parent router R1 transmits the "address determination authority acquisition release request" received via the frame transmission and reception part 11 to the address determination authority management part 4. The address determination authority management part 4 of the parent router R1 releases the acquisition of the address determination authority. The parent router R1 transmits an "address determination acquisition release response" to the router R2 via the routing control part 12.

In step S29, the address management part 3 of the parent router R1 causes the address determination authority management part 4 to acquire the address determination authority for the parent router R1 and transmits, as "address information transfer notices", the latest address information via the routing control part 12 to the routers R2 and R3 that are the devices complying with the present invention and registered based on the address information.

In step S30, each of the routers R2 and R3 transmits the "address information transfer notice" received via the frame transmission and reception part 11 to the address management part 3. The address management part 3 of each of the routers R2 and R3 updates the address information of each of the routers R2 and R3 based on the received address information, and transmits an "address information transfer response" to the parent router R1 via the routing control part 12.

Each of the routers R3 and R4 similarly repeats each of the above-described operations of the router R2. That is, in step S31, the parent router R1 releases the address determination authority to the router R4 as in the above-described step S9, and operations illustrated in FIGS. 7 through 9 up to step S32 are performed. In step S33 of FIG. 9, the parent router R1 releases the address determination authority to the router R3, and operations illustrated in FIGS. 9 and 10 up to step S34 are performed. Then, in step S35, the router R1 releases the address determination authority. Thereafter, path information is dynamically created by using RIP (Router Interchange Protocol), and communication can be performed after IP addresses are set for the terminals T1 and T4.

FIGS. 12 and 13 are diagrams showing signal frame formats employed in the above-described sequence. The frame format shown in FIG. 12 includes a destination MAC address, a sender MAC address, a protocol, and a data part. The data part consists of a control part and an information part. Each of the parent router inquiry request, the parent router inquiry response, the subordinate device detection request, the subordinate device detection response, the subordinate device setting request, and the subordinate device setting response is a signal having this frame format. Information for identifying these signals is written to the control part of the data part. The information part of each signal is recorded with information show in FIG. 12. The parent router inquiry request, for instance, has its information part recorded with a device-representative MAC address.

The frame format shown in FIG. 13 includes an IP header, a UDP header, and a data part. The data part consists of a control part and an information part. Signals having this frame format are shown in FIG. 13.

[Second Embodiment]

Next, a description will be given of a second embodiment of the present invention.

The second embodiment is different from the first embodiment in further including an operation in the case of the exhaustion of unused addresses at the time of address determination. A description will be given, with reference to FIG. 14, of the operation in the case of address exhaustion at the time of address determination by the router R4.

Figure 14:
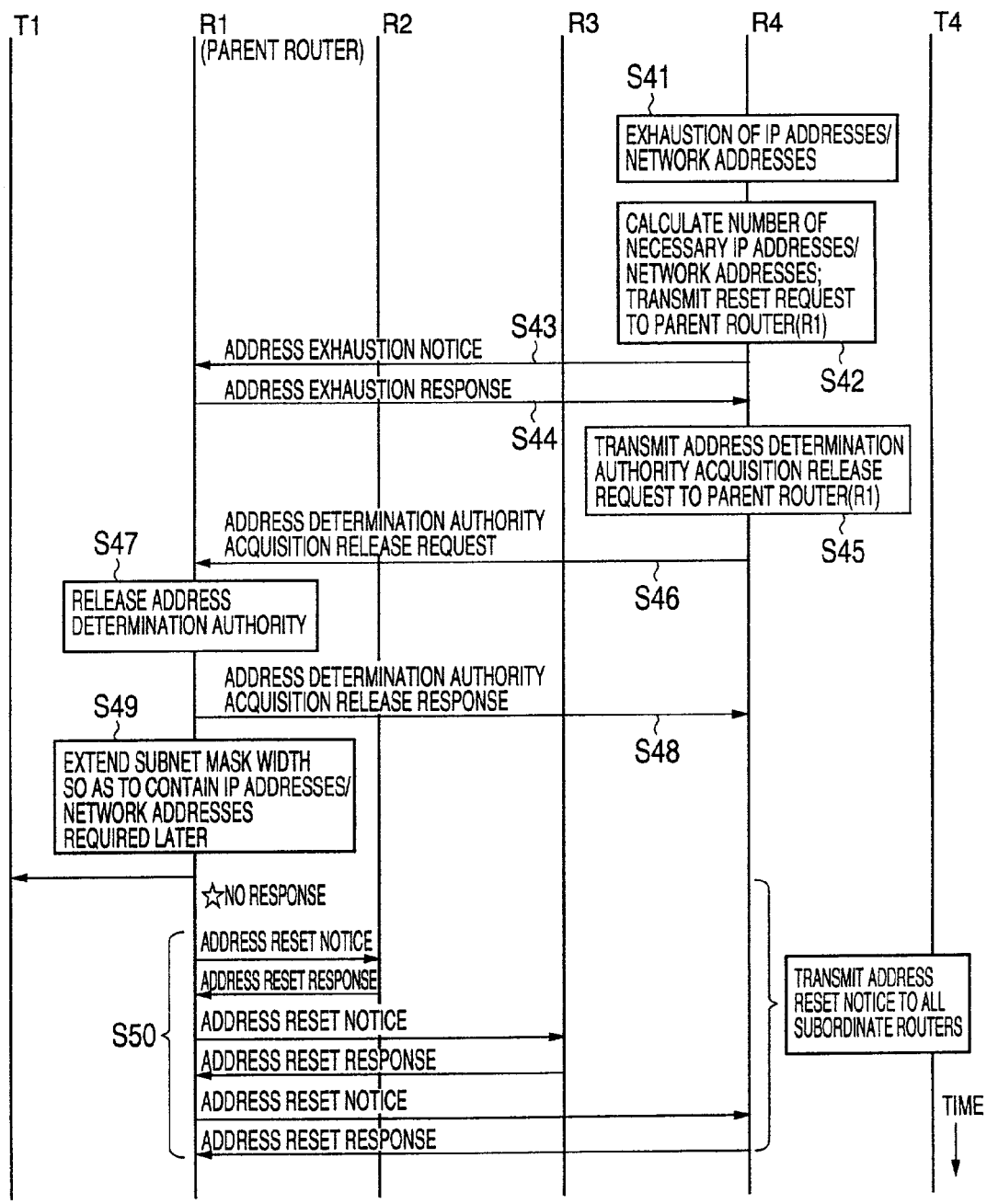
FIG. 14 is a diagram showing a communication sequence on a network including communication devices according to a second embodiment of the present invention.

In FIG. 14, when the address determination part 2 of the router R4 detects a shortage of network addresses at the time of network address determination (step S41), the address determination part 2 activates the address reset part 9. When the address determination part 2 calls the address reset part 9, in step S42, the address reset part 9 calculates the number of residual operable ports of the router R4 which ports are not assigned network addresses, and in step S43, transmits an "address exhaustion notice" to the parent router R1 via the routing control part 12.

In step S44, the parent router R1 has the "address exhaustion notice" received by its frame transmission and reception part 11 and transmitted to its address determination part 2. At this time, the address determination part 2 recognizes the number of residual ports of the router R4 in the frames of the "address exhaustion notice". Next, the address determination part 2 transmits an "address exhaustion response" to the router R4 via the routing control part 12.

In step S45, on receiving the "address exhaustion response" from the parent router R1 by its frame transmission and reception part 11, the router R4 resumes the operation from a response-awaiting state. In step S46, the router R4 transmits an "address determination authority acquisition release request" to the parent router R1 via the routing control part 12 since the router R4 has acquired the address determination authority.

In step S47, the parent router R1 has the "address determination authority acquisition release request" from the router R4 received by its frame transmission and reception part 11 and transmitted to the address determination authority management part 4, thereby releasing the address determination authority acquired by the router R4. Next, in step S48, the address determination authority management part 4 of the parent router R1 transmits an "address determination authority acquisition release response" to the router R4 via the routing control part 12.

The router R4 has the "address determination authority acquisition release response" received by its frame transmission and reception part 11 and transmitted to its address determination part 2.

In step S49, after the "address determination authority acquisition release response" being transmitted to the router R4, the address determination part 2 of the parent router R1 extends a subnet mask width that is provided based on the number of residual ports required by the router R4. In step S50, the parent router R1 transmits "address reset notices" to the routers R2 through R4 via the routing control part 12 so as to reset addresses for all the ports of the parent router R1 and all of the routers R2 through R4.

Thereafter, the parent router R1 acquires the address determination authority for itself and performs the operations illustrated in FIG. 4 of the first embodiment.

On the other hand, each of the routers R2 through R4 has the "address reset notice" received via the frame transmission and reception part 11 and transmitted to the address determination part 2, and waits until a "subordinate device detection request" is transmitted from the parent router R1.

Thus, according to the second embodiment of the present invention, even if network addresses are exhausted at the time of address determination, addresses can be determined by resetting the addresses.

[Third Embodiment]

Next, a description will be given of a third embodiment of the present invention.

Figure 15:
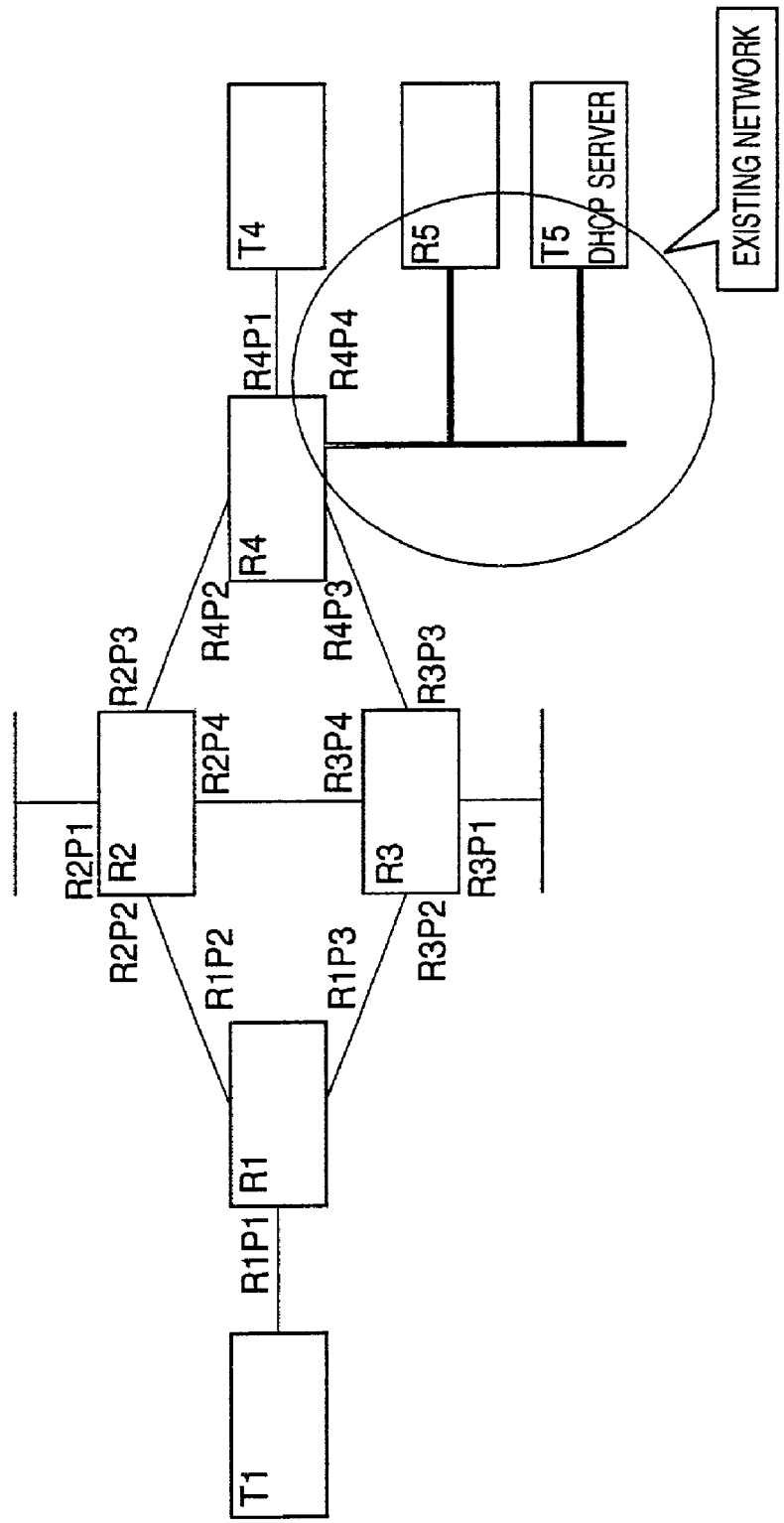
FIG. 15 is a block diagram showing a structure of a network including communication devices according to a third embodiment of the present invention.

FIG. 15 is a block diagram showing a structure of a network to which the third embodiment of the present invention is applied. The network of FIG. 15 is formed by connecting an existing network to a port R4P4 of the router R4 of the network shown in FIG. 2. Characteristically, network addresses can be determined automatically in such a case in the third embodiment. The existing network illustrated in FIG. 15 includes a router R5 and a terminal T5 such as a DHCP server.

Figure 16:
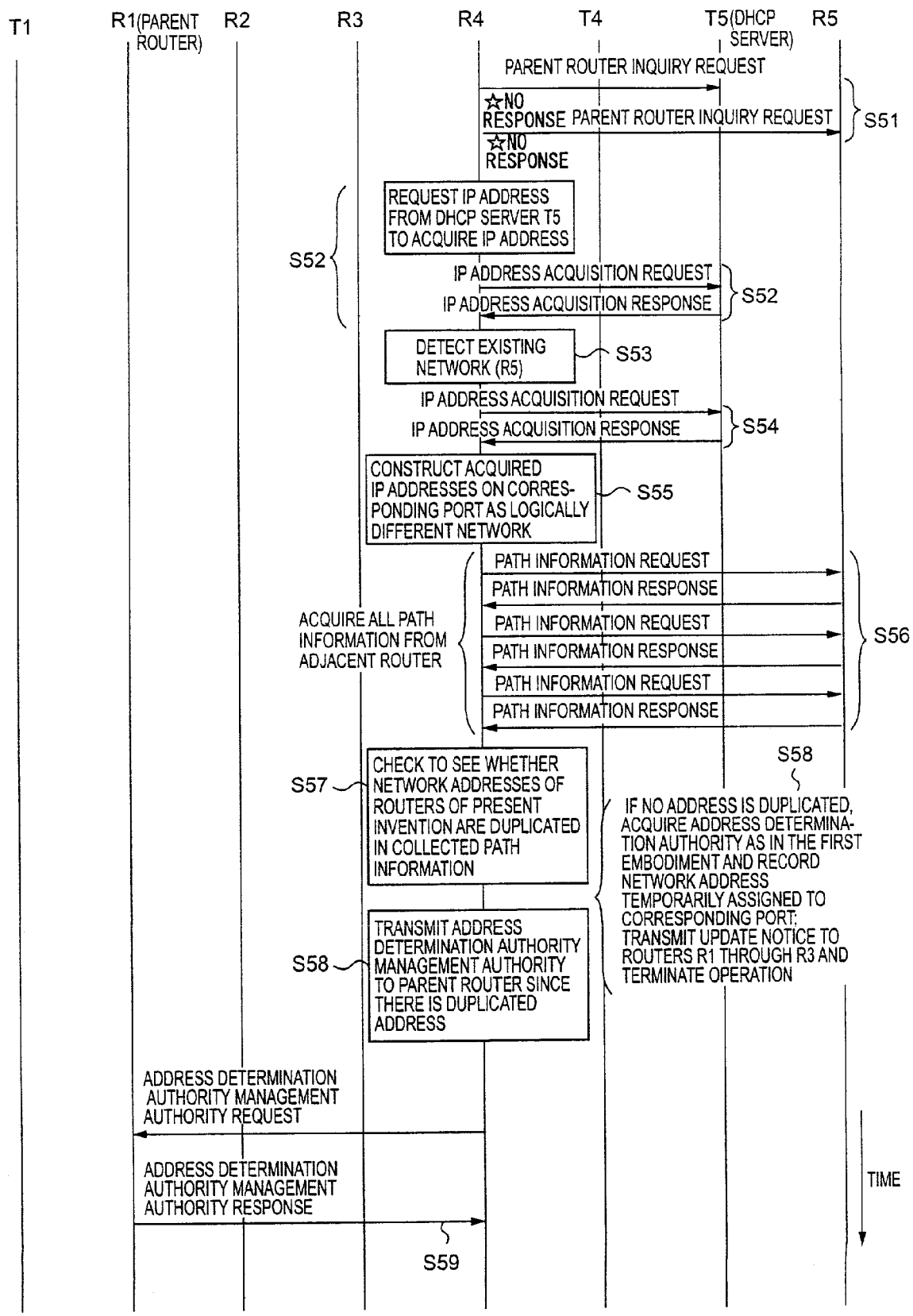
FIGS. 16 and 17 are diagrams showing a communication sequence on the network of FIG. 15.
Figure 17:
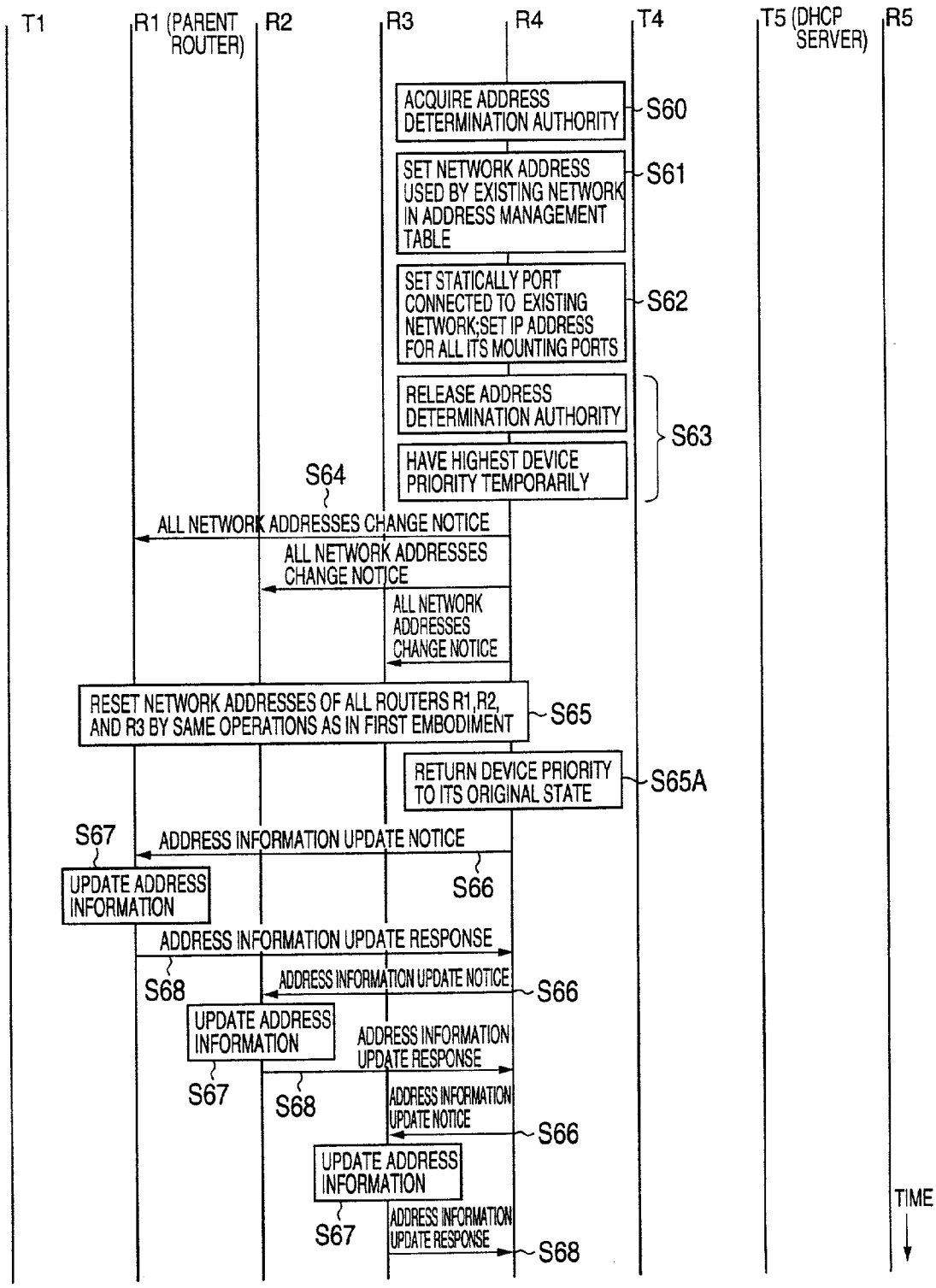

FIGS. 16 and 17 are diagrams showing a sequence of operations for automatically determining network addresses according to the third embodiment. In step S51 of FIG. 16, when the router R4 detects a linkup of the existing network to its mounting port (R4P4), the address determination part 2 of the router R4 causes the adjacent router communication part 1 to transmit a "parent router inquiry request" to the port by MAC broadcast.

If no "parent router inquiry response" is returned from the port, it is determined that no device complying with the present invention exists. In step S52, this determination result is transmitted to the existing network connection part 8, and a DHCP frame is transmitted to the DHCP server T5. In step S53, the router R4 detects the router R5 on the existing network by receiving a DHCP frame from the DHCP server T5 by its frame transmission and reception part 11 and transmitting the DHCP frame to its existing network connection part 8. In step S54, the router R4 broadcasts an "IP address acquisition request" to the network connected to the port and receives "IP address acquisition responses". Then, in step S55, the router R4 constructs IP addresses included in the DHCP frames as a logically different network.

In step S56, in order to obtain path information from the detected router R5, the existing network connection part 8 of the router R4 transmits a "path information request" to the router R5 via the routing control part 12. The router R5 returns a "path information response" to the router R4. This response is transmitted to the existing network connection part 8 of the router R4 via the frame transmission and reception part 11 thereof. The above-described operation is repeated so as to obtain all the path information from the router R5.

In step S57, the router R4 confirms whether the network addresses are duplicated by comparing the path information obtained from the router R5 and the address information. If no address is duplicated, in step S58, the router R4 acquires the address determination authority as in the first embodiment and statically records in the address information a network address temporarily assigned to the port connected to the existing network. Thereafter, the router R4 notifies the routers R1 through R3 complying with the present invention of an address update.

If there is a duplicated network address, in step S58, the existing network connection part 8 of the router R4 transmits an "address determination authority management authority request" to the parent router R1 via the routing control part 12. This request is transmitted to via the frame transmission and reception part 11 of the parent router R1 to the address determination authority management part 4 thereof so that, in step S59, an "address determination authority management authority response" is transmitted via the routing control part 12 to the router R4.

In step S60 of FIG. 17, the frame transmission and reception part 11 of the router R4 receives the "address determination authority management authority response" and transmits the response to the existing network connection part 8. Thereby, the router R4 acquires the address determination authority. Thereafter, in step S64, the router R4 transmits an "all network addresses change notice" to the routers R1 through R3 via the routing control part 12. Prior to this, in step S61, the existing network connection part 8 of the router R4 informs the address management part 3 thereof of the change of all the network addresses. In response to this, the address management part 3 of the router 4 initializes all the network address information generated on the networks of the devices having the structure of the communication device 100 of the present invention and develops the path information acquired from the router 5 and the address assigned to the port connected to the existing network. In step S62, the address management part 3 assigns addresses not included in the developed address information to the ports of the router 4 the addresses of which port are undecided. In step S63, the router 4 temporarily has the highest device priority and releases the address determination authority.

On the other hand, in step S64, each of the routers R1 through R3 has the "all network addresses change notice" transmitted to its address determination part 2 via its frame transmission and reception part 11. In step S65, each of the routers R1 through R3 holds the address of the next parent router R4 and waits for a "subordinate device detection request". Thereafter, in step S65, each of the routers R1 through R3 sets its own ports by the same operations as in the first embodiment.

Next, in step S65A, the existing network connection part 8 of the router R4 returns the device priority of the router R4 from the highest to its original state and in step S66, transmits an "address information update notice" to the routers R1 through R3 via the routing control part 12. In step S67, each of the routers R1 through R3 transmits the received "address information update notice" to its address determination part 2 via its frame transmission and reception part 11 so that the priority of the router R4 is returned to its original state. Thereafter, in step S68, each of the routers R1 through R3 transmits an "address information update response" to the router R4 via the routing control part 12.

The router R4 has the "address information update response" from each of the routers R1 through R3 received by its frame transmission and reception part 11 and transmitted to the existing network connection part 8 so as to release the address determination authority that has been held by the router 4.

Thus, according to the third embodiment of the present invention, even if an existing network is connected to the network formed by the routers of the present invention, network addresses can be determined automatically, and in some cases, all the network addresses may be changed.

[Fourth Embodiment]

Next, a description will be given of a fourth embodiment of the present invention. Characteristically, the configuration information control of a device is constructed based on configuration information in the fourth embodiment.

FIG. 18 is a diagram showing address information employed in the fourth embodiment. A network structure is equal to that shown in FIG. 2. A port R1P1 of the router R1 complies with predetermined configuration information. When a device having the structure of the communication device 100 of the present invention, such as the router 1, is turned on, the configuration development part 10 of the device reads configuration information from the configuration storage part 13 and constructs a system based on the configuration information. When the configuration development part 10 detects configuration information related to the address determination part 2, the configuration development part 10 posts the detection to the address determination part 2, thereby constructing a network reflecting the predetermined network address information.

Operations other than the operation at the time of turning on the device follow the sequence described by referring to FIGS. 3 through 10.

[Fifth Embodiment]

A fifth embodiment of the present invention is basically equal to the above-described first and fourth embodiments, but characteristically includes monitoring of the parent router.

Figure 19:
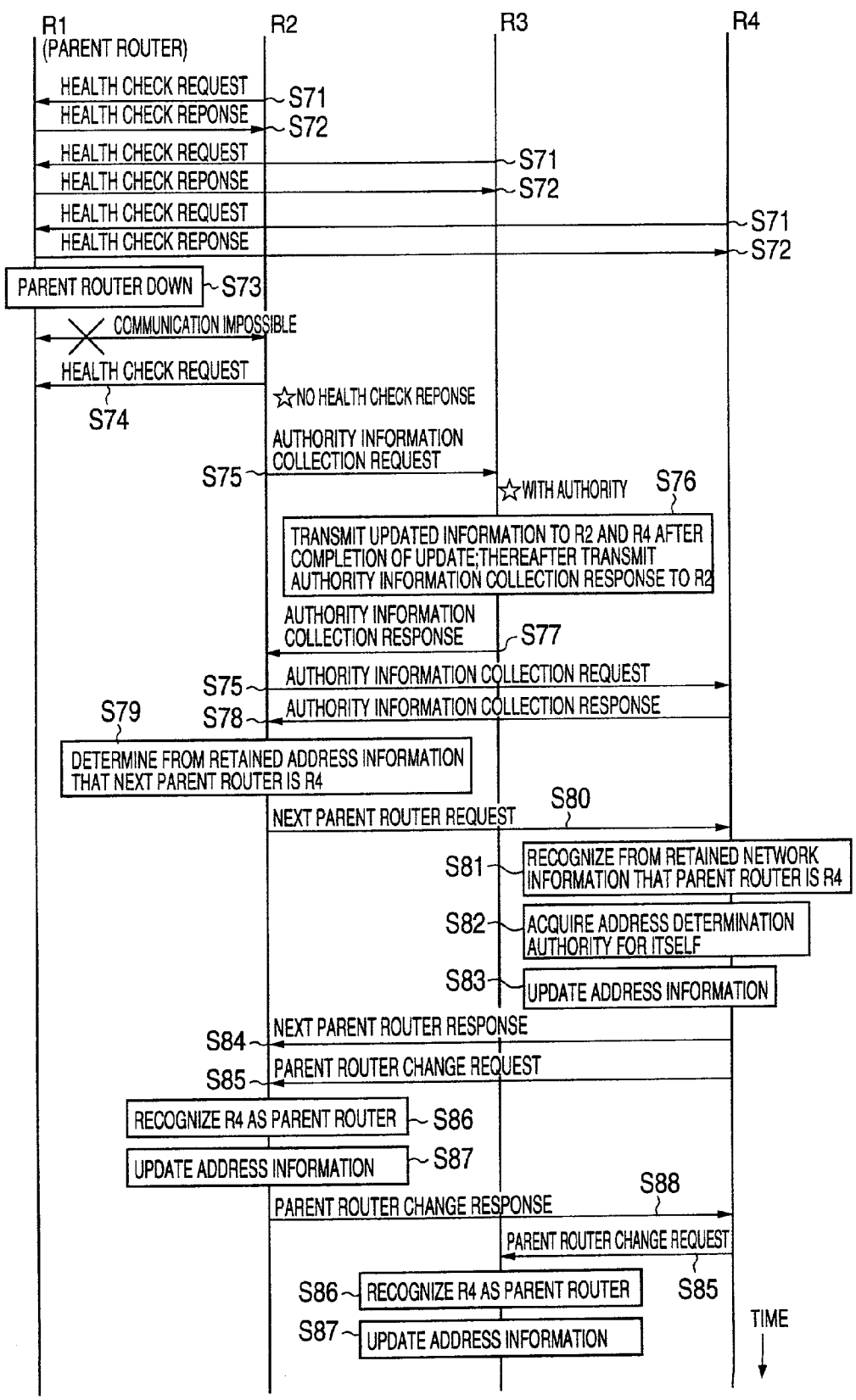
FIG. 19 is a diagram showing a communication sequence on a network including communication devices according to a fifth embodiment of the present invention.

In step S71 of FIG. 19, the router defect control part 7 of each of the routers R2 through R4 transmits a "health check request" to the parent router R1 via the frame transmission and reception part 11. In step S72, the parent router R1 has the "health check request" transmitted via its frame transmission and reception part 11 to its router defect control part 7. The router defect control part 7 of the parent router R1 transmits a "health check response" to each of the routers R2 through R4 via the routing control part 12. The router defect control part 7 of each of the routers R2 through R4 receives the "health check response" via the frame transmission and reception part 11 to confirm that the parent router R1 is in normal operation. This operation is periodically performed so as to confirm whether the parent router R1 is in normal operation.

A description will be given below of a case where the router R2 first senses that the parent router R1 has gone down.

At this point, if the parent router R1 becomes inoperative (step S73), the following operations are performed with the router defect control part 7 of the router 2 sensing that the "health check response" is not returned to each of the routers R2 through R4 (step S74).

In step S75, in order to confirm the existence of a router currently holding the address determination authority, the router defect control part 7 of the router R2 requests the address management part 3 to transmit an "authority information collection request" to each of the routers R3 and R4 via the routing control part 12. In step S78, the address determination authority management part 4 of each of the routers R3 and R4 receives the "authority information collection request" via the frame transmission and reception part 11. At this point, when the router defect control part 7 of the router R4 receives the "authority information collection request" via the frame transmission and reception part 11, the router defect control part 7 inquires of the address determination authority management part 4 of the router R4 whether the router R4 holds the address determination authority. Since the router R4 does not hold the address determination authority, the router defect control part 7 transmits an "authority information collection response" to the router R2 via the routing control part 12, noting that the router R4 does not hold the address determination authority.

On the other hand, in step S76, when the router defect control part 7 of the router R3 receives the "authority information collection request" via the frame transmission and reception part 11, the router defect control part 7 inquires of the address determination authority management part 4 of the router R3 whether the router R3 holds the address determination authority. However, since the router R3 is currently under an update operation, update information is first transmitted to each of the routers R2 and R4 after the update operation is terminated. Then, in step S77, the router defect control part 7 transmits an "authority information collection response" to the router R2 via the routing control part 12, noting that the router R3 holds the address determination authority.

In step S79, the frame transmission and reception part 11 of the router R2 transmits each received "authority information collection response" to the router defect control part 7 to detect the routers R3 and R4 that are ready for communication. The router defect control part 7 of the router R2 recognizes from the previously acquired address information that the next parent router candidate is the router R4. In step S80, the router defect control part 7 transmits a "next parent router request" to the router R4 via the routing control part 12.

In step S81, the router R4 has the "next parent router request" received by its frame transmission and reception part 11 and transmitted to the address determination authority management part 4 via the router defect control part 7. The router R4 recognizes that the next parent router candidate is the router R4. In step S82, the next parent router R4 acquires the address determination authority for itself and, in step S83, updates parent router information through the address management part 3. In step S84, the next parent router R4 returns a "next parent router response" to the router R2 via the routing control part 12.

In step S85, the next parent router R4 transmits a "parent router change request" to each of the routers R2 and R3 via the routing control part 12 with the parent router information updated by the address determination authority management part 4 being added to the request.

In step S86, each of the routers R2 and R3 has the "parent router change request" received via its frame transmission and reception part 11 and transmitted to its address determination authority management part 4. The address determination authority management part 4 recognizes the router R4 as a parent router. Further, in step S87, the address determination authority management part 4 informs the address management part 3 that the parent router is the router R4 to update the address information. In step S88, the address determination authority management part 4 transmits a "parent router change response" to the router R4 via the routing control part 12.

The next parent router R4 has the "parent router change response" from each of the routers R2 and R3 received by its frame transmission and reception part 11 and transmitted to its address determination authority management part 4, thereby terminating the operation.

Thus, according to the fifth embodiment of the present invention, a parent router can be monitored periodically, thereby increasing the reliability of a network.

[Sixth Embodiment]

A sixth embodiment of the present invention is characterized in that a device operates, in setting terminal addresses, based on information indicating whether the device determines the terminal addresses by itself or performs a relay operation to another device that determines the terminal addresses.

Figure 20:
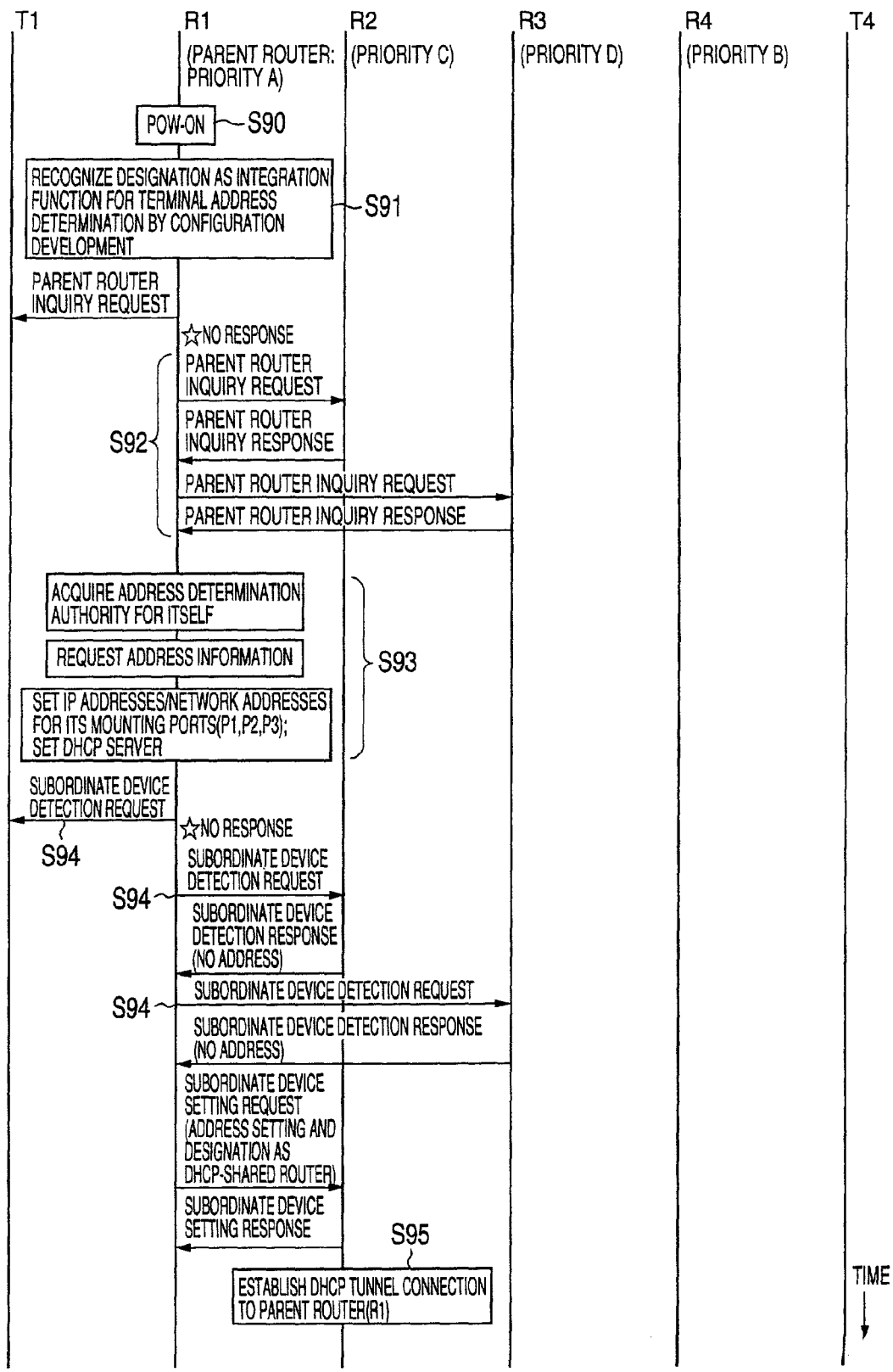
FIG. 20 is a diagram showing a communication sequence on a network including communication devices according to a sixth embodiment of the present invention.

FIG. 20 is a diagram showing an operation sequence according to the sixth embodiment of the present invention. After the parent router R1 is turned on in step S90, in step S91, the configuration development part 10 of the parent router R1 notifies the terminal address determining device determination part 6 of terminal address setting conditions. The terminal address determining device determination part 6 recognizes a designation as an integration function for terminal address determination by configuration development. The address management part 3 enters the contents of the transmitted setting conditions in the address information.

In step S92, the router R1 transmits a "parent router inquiry request" to each of the adjacent terminal T1 and the routers R2 and R3, and receives a "parent router inquiry response" from each of the adjacent terminal T1 and the routers R2 and R3. Thereafter, in step S93, the router R1 performs the same operations as in steps S3 through S5 of FIG. 4. Then, in step S94, the router R1 transmits a "subordinate device detection request" to each of the adjacent terminal T1 and the routers R2 and R3, and receives a "subordinate device detection response" from each of the adjacent terminal T1 and the routers R2 and R3. Since each of the responses from the routers R2 and R3 lacks an address, the router R1 transmits a "subordinate device setting request" (address setting and designation as a DHCP-shared router) to the router R2 and receives a "subordinate device setting response" therefrom.

In step S95, the address determination part 2 of the router R2 receives the "subordinate device setting request" and requests the terminal address determination part 5 to set a DHCP function for each of the ports of the router 2. The terminal address determination part 5 judges the contents of the received information so as to be prevented from setting the DHCP function. Instead, the terminal address determination part 5 requests the terminal address determining device determination part 6 to establish tunnel connection to the parent router R1.

Figure 21:
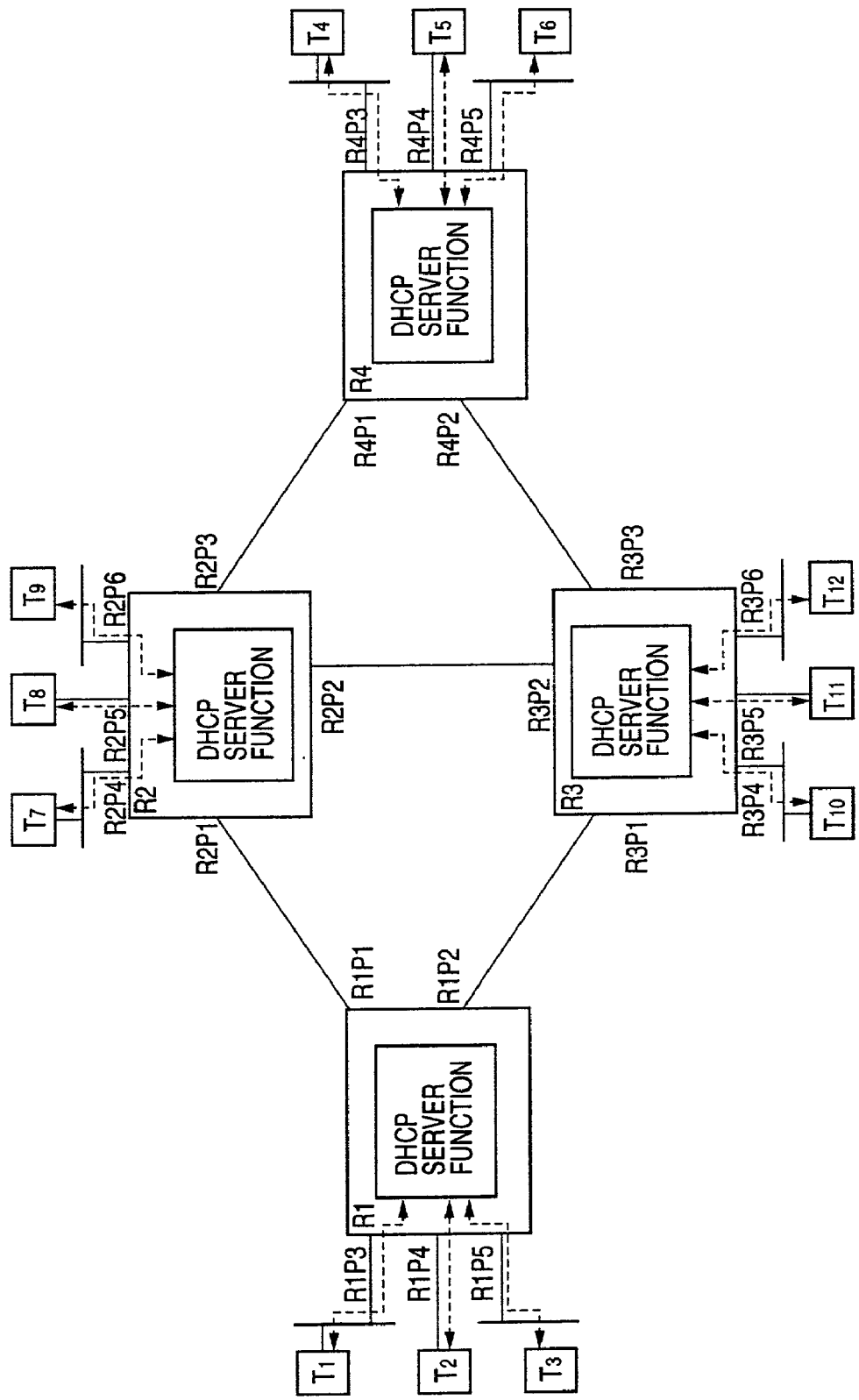
FIG. 21 is a diagram showing a case where a DHCP server function is set in each router.

FIG. 21 is a diagram showing a case where a DHCP server function is set in each of the routers R1 through R4. This corresponds to setting functions in step S8 of FIG. 4 and step S21 of FIG. 6. Each of the routers R1 through R4 has the network addresses of its ports set by its DHCP server function.

Figure 22:
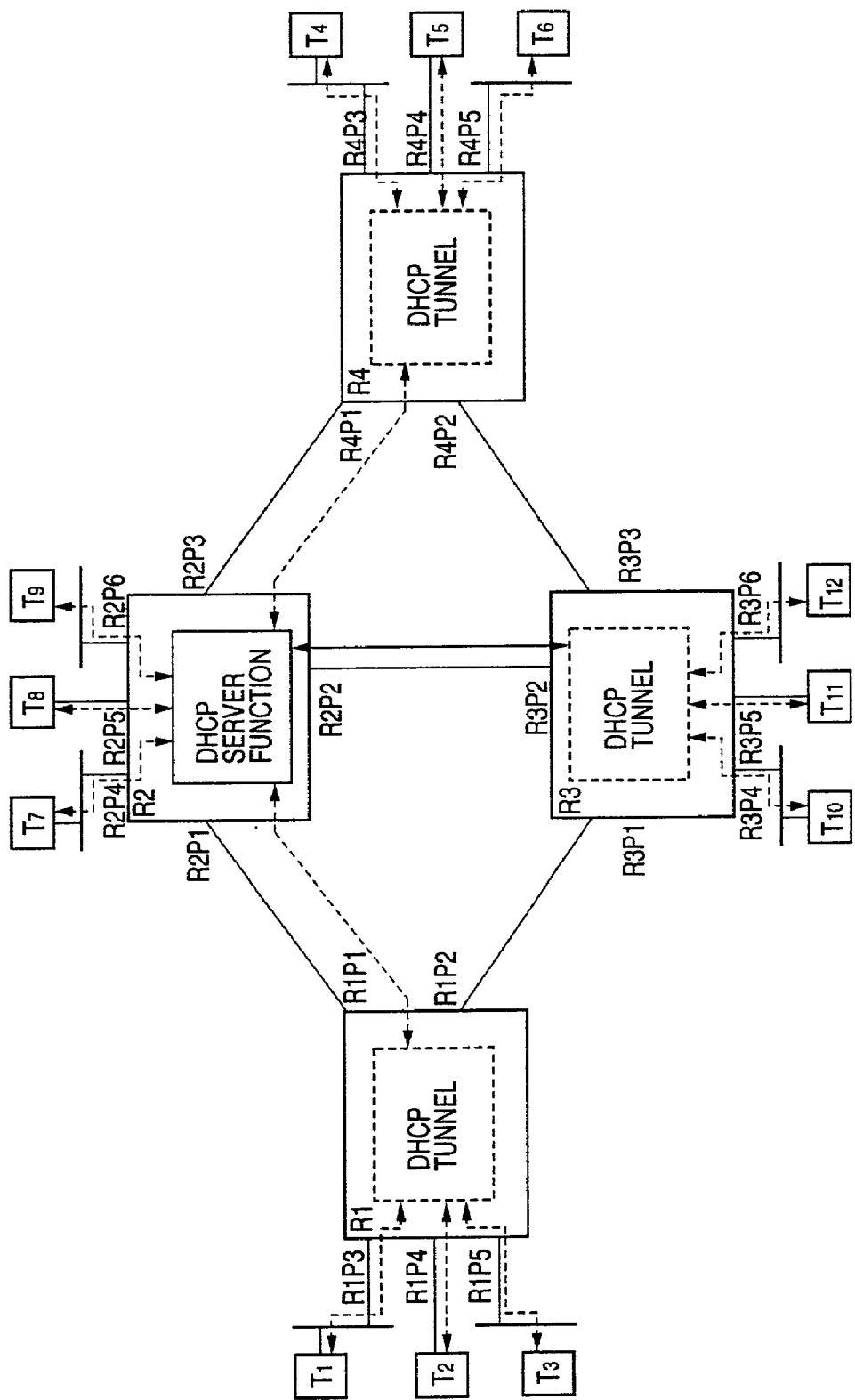
FIG. 22 is a diagram showing a case where centralized management is performed on a DHCP server function.

FIG. 22 is a diagram showing a case where centralized management is performed on a DHCP server function. In this case, the router R2 performs the centralized management of the DHCP function. That is, the router R2 set network addresses for all the ports of the routers R1 through R4. This operation corresponds to the operation of step S95 of FIG. 20.

According to the above-described embodiments, the following effects are produced.

(1) Efforts can be reduced substantially in constructing a network.

(2) A flexible network can be constructed automatically.

(3) Coexistence with an existing network is allowed.

(4) Logical and consistent automatic address assignment can be performed in a short time.

The present invention is not limited to the specifically disclosed embodiments, but variations and modifications may be made without departing from the scope of the present invention. For instance, the number of terminals or routers connected to a network is not limited to the number employed in each of the embodiments, but may be determined at discretion.

The present application is based on Japanese priority application No. 2001-130217 filed on Apr. 26, 2001, the entire contents of which are hereby incorporated by reference.

What is claimed is:

1. A communication device comprising:
    a first part transmitting information to and receiving information from an adjacent device;
    a second part automatically determining addresses for mounting ports of the communication device and a first port of the adjacent device so that the addresses are not duplicated, the first port being connected to the communication device;
    a third part managing address information of all the mounting ports of the communication device, the first port of the adjacent device, and a network to be constructed;
    a fourth part managing address determination authority to determine the addresses,
    wherein one of the communication device and another device in the network to be constructed is selected as a parent communication device having address determination authority to determine the addresses in the network;
    a fifth part automatically selecting an unused address from the network including a port to which a terminal is connected, the port being one of the mounting ports of the communication device or a second port of the adjacent device; and
    a sixth part selecting one of the communication device and the adjacent device as a managing device performing centralized management of addresses of terminals on the network,
    wherein said fifth part sets a DHCP server function in the communication device if the sixth part selects the communication device as the managing device and the sixth part establishes tunnel connection to the adjacent device if the sixth part selects the adjacent device as the managing device.

2. The communication device as claimed in claim 1, further comprising a seventh part resetting the addresses if the addresses are exhausted.

3. The communication device as claimed in claim 1, further comprising a seventh part determining addresses for connecting the network constructed by dynamic address assignment and an existing network constructed by static address assignment based on configuration information.

4. The communication device as claimed in claim 1, further comprising a seventh part constructing configuration information of the communication device based on configuration information including address information preset for the mounting ports.

5. The communication device as claimed in claim 1, further comprising a seventh part controlling a defect of one of the communication device and the adjacent device which one manages the address determination authority.

6. The communication device as claimed in claim 1, further comprising a seventh part selecting one of the communication device and the adjacent device as a device performing centralized management of addresses of terminals on the network.

7. A communication device control method comprising the steps of:
  (a) determining automatically addresses for all mounting ports of a communication device and a first port of an adjacent device connected to the communication device through the first port so that the addresses are not duplicated, the communication device and the adjacent device being included in a network to be constructed;
  (b) selecting one of the communication device and another device in the network to be constructed as a parent communication device having address determination authority to determine the addresses in the network, wherein the parent communication device manages address information of the mounting ports of the communication device, the first port of the adjacent device, and the network to be constructed;
  (c) selecting automatically an unused one from addresses on a network including a port to which a terminal is connected, the port being one of the mounting ports of the communication device or a second port of the adjacent device; and
  (d) selecting one of the communication device and the adjacent device as a managing device performing centralized management of addresses of terminals on the network,
  wherein said step (c) sets a DHCP server function in the communication device if said step (d) selects the communication device as the managing device and said step (d) establishes tunnel connection to the adjacent device if said step (d) selects the adjacent device as the managing device.

8. The method as claimed in claim 7, wherein said step (a) comprises the step of (e) resetting the addresses if the addresses are exhausted.

9. The method as claimed in claim 7, wherein said step (a) comprises the step of (e) determining addresses for connecting the network constructed by dynamic address assignment and an existing network constructed by static address assignment based on configuration information.

10. The method as claimed in claim 7, wherein said step (a) comprises the step of (e) constructing configuration information of the communication device based on configuration information including address information preset for the mounting ports.

11. The method as claimed in claim 7, wherein said step (a) comprises the step of (e) controlling a defect of one of the communication device and the adjacent device which one manages the address determination authority.

12. The method as claimed in claim 7, further comprising the step of (e) selecting one of the communication device and the adjacent device as a device performing centralized management of addresses of terminals on the network.

* * * * *